United States Patent
Matsuo et al.

(10) Patent No.: US 8,319,482 B2
(45) Date of Patent: Nov. 27, 2012

(54) POWER SUPPLY AND POWER CONTROL DEVICE

(75) Inventors: Yoshihiko Matsuo, Yokohama (JP); Takeshi Kimura, Yokohama (JP); Osamu Takahashi, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 331 days.

(21) Appl. No.: 12/716,133

(22) Filed: Mar. 2, 2010

(65) Prior Publication Data

US 2010/0237841 A1 Sep. 23, 2010

(30) Foreign Application Priority Data

Mar. 17, 2009 (JP) .................................. 2009-63897

(51) Int. Cl.
 *G05F 1/613* (2006.01)
(52) U.S. Cl. .......................... 323/224; 323/284; 323/285
(58) Field of Classification Search .................. 323/224, 323/283, 282, 284, 285
See application file for complete search history.

(56) References Cited

U.S. PATENT DOCUMENTS 6,583,610 B2 *  6/2003  Groom et al. ................. 323/288
7,161,333 B2 *  1/2007  Soch ............................ 323/224

FOREIGN PATENT DOCUMENTS

JP           2000-245150 A       9/2000

* cited by examiner

*Primary Examiner* — Shawn Riley
(74) *Attorney, Agent, or Firm* — Arent Fox LLP

(57) ABSTRACT

A power supply includes a first switch and a second switch coupled in series between an input voltage terminal to which an input voltage is applied and a reference voltage terminal to which a reference voltage lower than the input voltage is applied, an inductor disposed between a junction coupling the first and second switches and an output terminal from which an output voltage is output, and a controller controlling the first and second switches to be alternately switched at a given switching cycle depending on an error of the output voltage with respect to a target voltage, wherein the controller changes the switching cycle from a first cycle to a second cycle longer than the first cycle, depending on a voltage at the junction when the second switch is in a turned-on state.

20 Claims, 20 Drawing Sheets

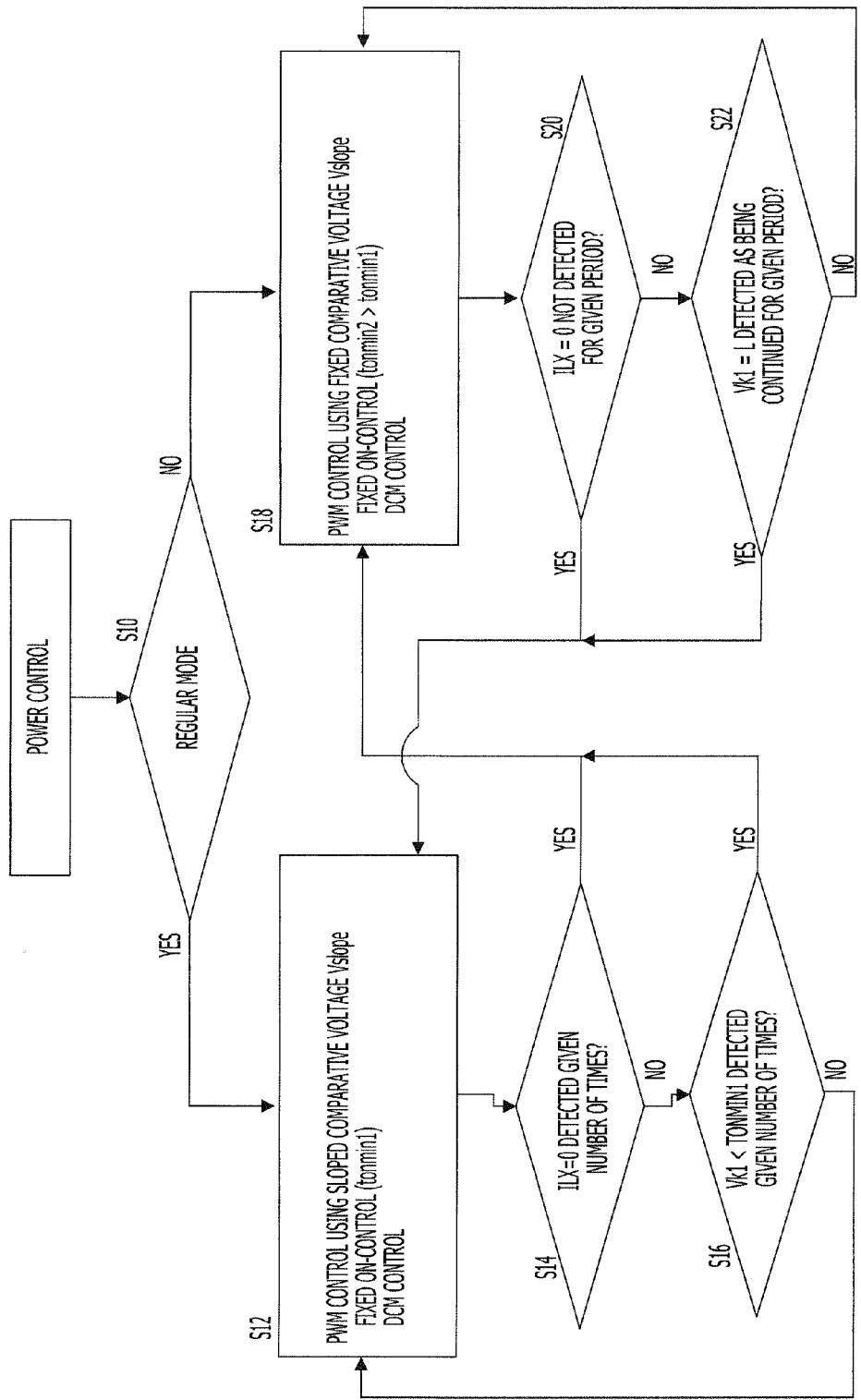

POWER SUPPLY AND POWER CONTROL DEVICE

CROSS-REFERENCE TO RELATED APPLICATION

This application is based upon and claims the benefit of priorities of the prior Japanese Patent Application No. 2009-063897, filed on Mar. 17, 2009, the entire contents of which are incorporated herein by reference.

FIELD

The embodiments discussed herein relate to a power supply and a power control device.

BACKGROUND

A power supply produces, from an input DC power of a certain voltage, an output DC power of a desired voltage. The produced output DC power is supplied as source power to various electronic circuit devices, such as a system LSI and a memory device.

Such a power supply is also called a DC-DC converter for converting an input DC voltage to an output DC voltage that differs from the input DC voltage. A recent demand for saving electric power has been imposed on the power supply as well. Thus, it has been required to produce an output power with optimum efficiency depending on the load state of an electronic circuit device to which the output power is supplied. To meet the demand for saving electric power, in particular, a recent LSI is designed to have a plurality of power domains and to finely control a power supplied state and a power stopped state per power domain. Therefore, the load state of the power supply changes in a complex way. Correspondingly, it is required that the power supply is flexibly adaptable for changes of the load state and may efficiently produce power. For example, the power supply is required to detect a light load and to produce a power adapted for the detected load with high efficiency. Japanese Unexamined Patent Application Publication No. 2000-245150 discloses a switching power supply circuit intended to meet that requirement.

In the power supply, for example, a high-side output transistor and a low-side output transistor are alternately switched over such that electric charges are supplied to an output terminal coupled to a junction between both the transistors. Further, an output voltage is controlled to be held at a target value by prolonging a driving time of the high-side output transistor when an output load increases, and by shortening the driving time thereof when the output load reduces.

It is desired that the power supply detects a reduction of the output load and makes a shift to a low consumption current mode upon the detection. To that end, the power supply monitors a current of the high-side output transistor and detects a light load when the current decreases.

However, the method of detecting a current reduction in the output transistor has a difficulty in detecting the current reduction with high accuracy, and detection of a low load may not be performed with high accuracy. Further, the method of monitoring the current is poor in response.

SUMMARY

According to an aspect of the embodiments, a power supply includes a first switch and a second switch coupled in series between an input voltage terminal to which an input voltage is applied and a reference voltage terminal to which a reference voltage lower than the input voltage is applied, an inductor disposed between a junction coupling the first and second switches and an output terminal from which an output voltage is output, and a controller controlling the first and second switches to be alternately switched at a given switching cycle depending on an error of the output voltage with respect to a target voltage, wherein the controller changes the switching cycle from a first cycle to a second cycle longer than the first cycle, depending on a voltage at the junction when the second switch is in a turned-on state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE EMBODIMENTS

FIG. 20 illustrates a flowchart for power control in the power supply of FIG. 5 or the power supply of FIG. 6.

DESCRIPTION OF EMBODIMENTS

Figure 1:
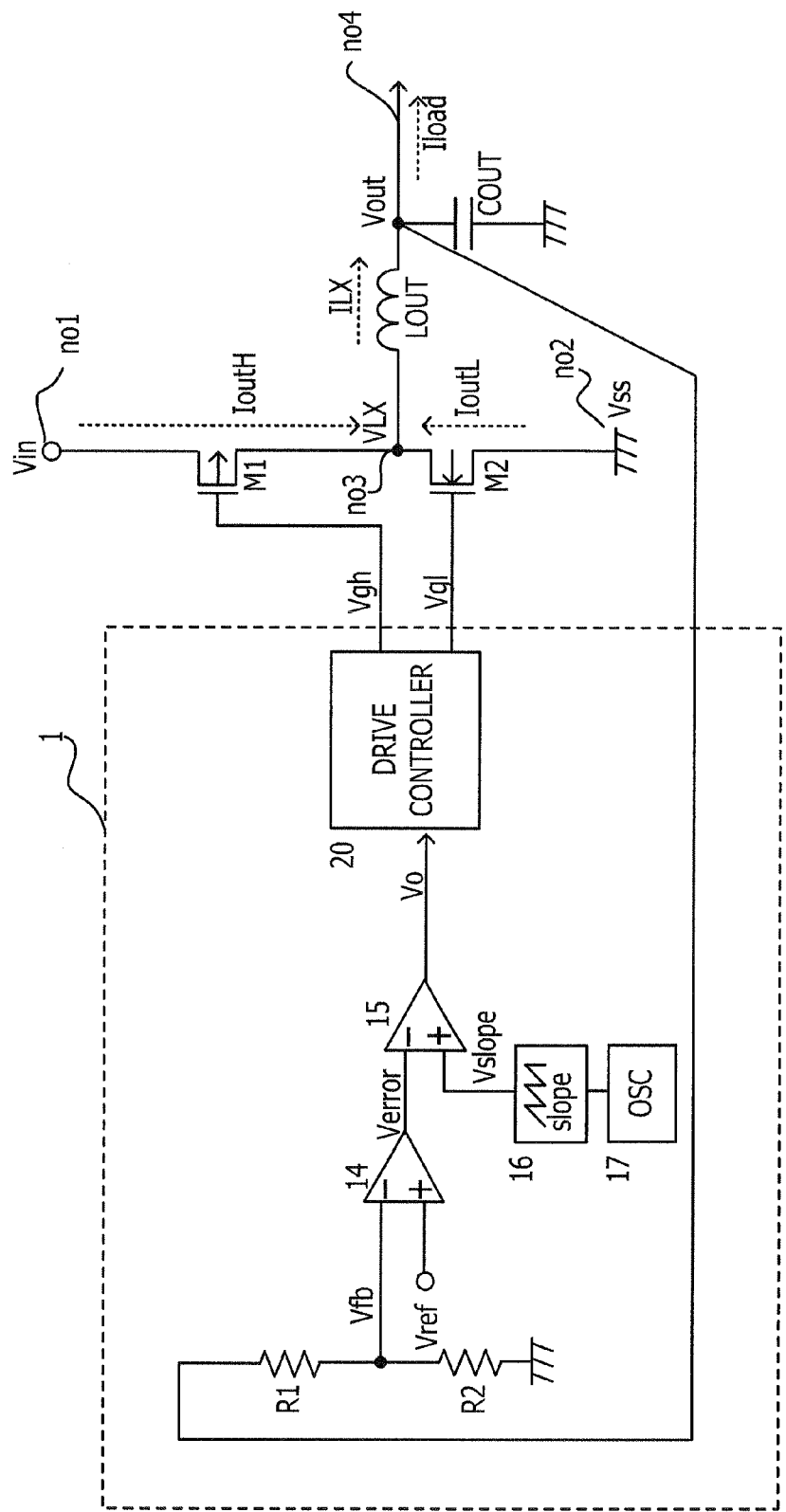
FIG. 1 illustrates a power supply.

FIG. 1 illustrates a power supply. The power supply of FIG. 1 includes a first switch M1 and a second switch M2 coupled in series between an input voltage terminal n01 to which an input voltage VIN is applied and a reference voltage terminal n02 to which a reference voltage Vss (e.g., a ground level) lower than the input voltage is applied, an inductor LOUT disposed between a junction n03 coupling the first and second switches and an output terminal n04 from which an output voltage Vout is output, and a control unit 1 for controlling the first and second switches to be alternately switched over at a given switching cycle depending on an error of the output voltage Vout with respect to a target voltage.

The first switch M1 is a high-side transistor made up of a P-channel MOS transistor and is controlled to be conducted (turned on) or non-conducted (turned off) by a gate drive signal Vgh generated from the control unit 1. The second switch M2 is a low-side transistor made up of an N-channel MOS transistor and is controlled to be conducted (turned on) or non-conducted (turned off) by a gate drive signal Vgl generated from the control unit 1.

A capacitor COUT is disposed between the output terminal n04 and the reference voltage Vss. The inductor LOUT and the capacitor COUT make up a smoothing circuit. The output terminal n04 is coupled to a power terminal of a load circuit (not shown) for supplying a load current Iload to the load circuit.

The input voltage VIN is a DC voltage at a given level, and the output voltage Vout is a DC voltage lower than the input voltage VIN. Also, the reference voltage Vss is, e.g., a ground voltage.

The control unit 1 includes an error amplifier 14 for amplifying an error between a feedback voltage Vfb, which is obtained by dividing the output voltage Vout with feedback resistances R1 and R2, and a target reference voltage Vref, a first comparator 15 for comparing an error (voltage) Verror produced by the error amplifier 14 with a comparative (sloped) voltage Vslope, and a drive controller 20 for driving the first and second switches M1 and M2 depending on a comparison result Vo of the first comparator 15. The first comparator 15 shifts the output result Vo to an H level upon detecting that the output voltage Vout has become lower than the target voltage. Accordingly, the drive controller 20 shifts the gate drive signal Vgh to an L level, thus turning on the first switch M1.

In a regular mode, the first comparator 15 compares the error Verror with the sloped voltage Vslope that rises and falls at a first cycle, and the driver controller 20 performs pulse width modulation (PWM) control to bring the first switch M1 into a turned-on state depending on an input/output voltage ratio. For example, when the error Verror is large (when the output voltage Vout is much lower than the target voltage), the driver controller 20 performs the pulse width modulation control so that the first switch M1 is held in the turned-on state for a longer time than when the error Verror is small. An oscillator (OSC) 17 oscillates at the first cycle, and a comparative voltage generator 16 generates the sloped voltage Vslope that rises and falls at the first cycle.

The first comparator 15 in the control unit 1 may also generate an output signal Vo, which is similar to the above-described one, by comparing a voltage resulting from adding the target reference voltage Vref and the comparative voltage Vslope with the feedback voltage Vfb.

In the regular mode, the control unit 1 controls the first switch M1 and the second switch M2 to be alternately turned on and off at the first cycle. To that end, the first comparator 15 compares the sloped voltage Vslope having the first cycle with the error voltage Verror and performs PWM control for modulating a magnitude of the error voltage Verror to a pulse width of the output signal Vo. Further, the driver controller 20 generates the gate drive signals Vgh and Vgl depending on the output signal Vo of the first comparator 15, to thereby control turning-on/off of the first and second switches M1 and M2.

Figure 2:
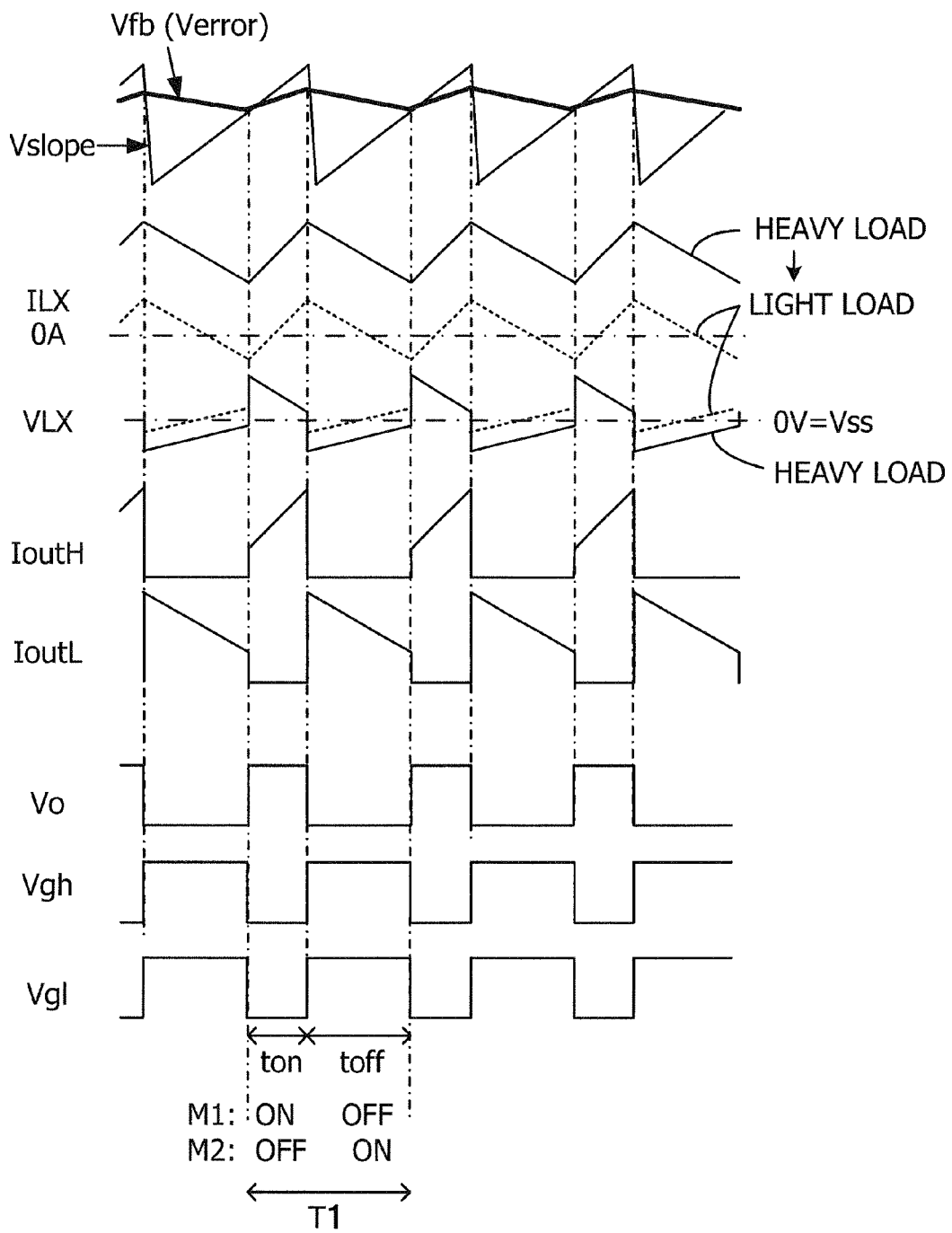
FIG. 2 illustrates operation waveforms of the power supply of FIG. 1.

FIG. 2 illustrates operation waveforms of the power supply of FIG. 1. Referring to FIG. 2, in a first (anterior) period ton of the first cycle T1, the gate drive signal Vgh is shifted to an L level, whereupon the first switch M1 is turned on and a high-side output current IoutH flows. At that time, the gate drive signal Vgl is at an L level and the second switch M2 is turned off. Further, in the first period ton, with the turning-on of the first switch M1, a junction voltage VLX rises to approximate the input voltage VIN and the high-side output current IoutH rises gradually depending on the inductor LOUT. Correspondingly, the junction voltage VLX decreases gradually. During the first period ton, the high-side output current IoutH continues to rise similarly to the inductor current ILX, while the inductor LOUT accumulates electromagnetic energy. Accordingly, the feedback voltage Vfb also rises.

Referring to FIG. 2, in a second (posterior) period toff of the first cycle T1, the gate drive signal Vgh is shifted to an H level, whereupon the first switch M1 is turned off, and the gate drive signal Vgl is shifted to an H level, whereupon the second switch M2 is turned on. After the turning-on of the second switch M2, the inductor LOUT makes the inductor current ILX continuously flow with the regenerative operation based on the accumulated electromagnetic energy, and hence a low-side output current IoutL flows from the reference voltage Vss to the junction n03 through the second switch M2. Therefore, the junction voltage VLX temporarily becomes a negative potential, as illustrated in FIG. 2. Since the electromagnetic energy is released with the regenerative operation of the inductor LOUT, the inductor current ILX decreases gradually. Correspondingly, the junction voltage VLX rises from the negative potential toward 0 V. Further, with the decrease of the inductor current ILX, the feedback voltage Vfb also falls.

As described above, in the first period ton of the first cycle T1, the first switch M1 is turned on to supply electric charges from the input voltage VIN to the output terminal n04. Therefore, the output voltage Vout rises and the feedback voltage Vfb also rises. On the other hand, in the second period toff of the first cycle T1, the second switch M2 is turned on to supply electric charges to the output terminal n04 with the regenerative operation of the inductor LOUT. Therefore, the output voltage Vout falls and the feedback voltage Vfb also falls.

As illustrated in FIG. 2, the first comparator 15 in the control unit 1 shifts the output signal Vo to an H level during a period in which the error voltage Verror is lower than the sloped voltage Vslope, and shifts the output signal Vo to an L level during a period in which the error voltage Verror is higher than the sloped voltage Vslope. When a load decreases, the output voltage Vout rises and the feedback voltage Vfb also rises, whereby the H-level period of the output signal Vo from the first comparator 15 is shortened. With the shortening of the H-level period of the output signal Vo, the turned-on period ton of the first switch M1 is shortened, and hence the output voltage Vout decreases.

In an equilibrium state during the regular operation, an on-duty of the first switch M1, corresponding to the turned-on period ton, is expressed by the following formula:

$$\text{Duty}=\text{ton}/T1=\text{Vout}/\text{VIN} \qquad (1)$$

Here, it is assumed that the output voltage Vout becomes substantially equal to the target voltage in the equilibrium state. In other words, the output voltage Vout rises by controlling the turned-on period ton, during which the first switch M1 is turned on, to become longer.

In FIG. 2, the solid line in the chart of the inductor current ILX represents the case of a heavy load, and the dotted line in the chart of the inductor current ILX represents the case of a light load. Also, the solid line in the chart of the junction voltage VLX represents the case of a heavy load, and the dotted line in the same chart represents the case of a light load. During a period of the heavy load, because the turned-on period ton of the first switch M1 is long, the inductor LOUT accumulates a sufficient amount of energy and the inductor current ILX does not decrease below 0 A.

On the other hand, when coming into a light load state, the turned-on period ton of the first switch M1 is shortened and the amount of energy accumulated in the inductor LOUT is reduced. Therefore, the inductor current ILX decreases below 0 A and becomes a minus current (reversed current). An arrow in FIG. 2 indicates a transition from the heavy load to the light load. Correspondingly, the junction voltage VLX turns from a negative potential to a positive potential above 0 V (=Vss). Thus, in the case of the light load, the low-side current IoutL flows through the second switch M2 in a direction from the junction n03 to the reference voltage point n02.

As described above, since the control unit 1 performs the PWM control to compare the sloped voltage Vslope in the first cycle T1 with the error voltage Verror, the first switch M1 is controlled to be turned on at the first cycle T1.

Figure 3:
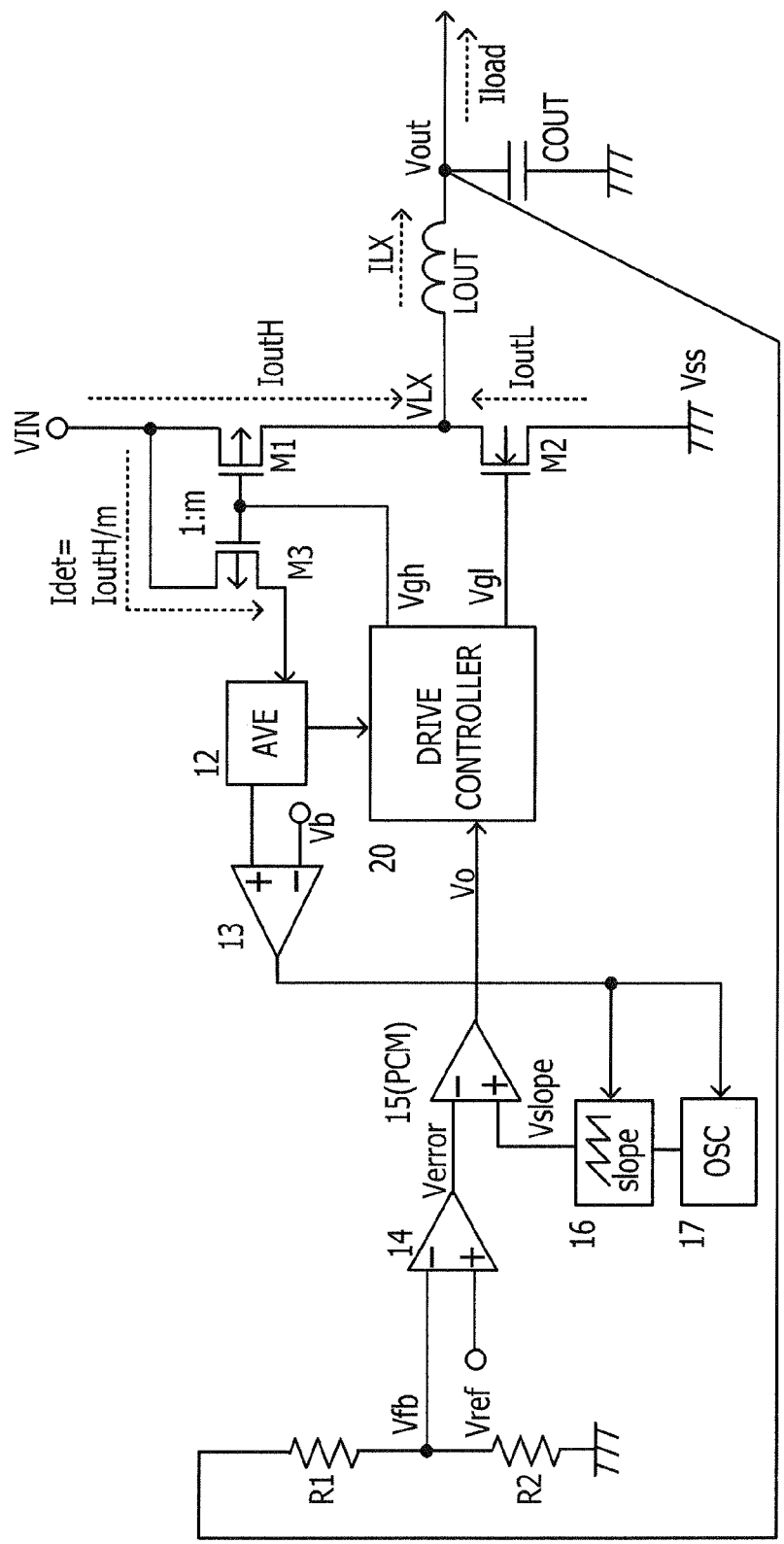
FIG. 3 illustrates a power supply including a light load detection circuit.

FIG. 3 illustrates a power supply including a light load detection circuit. The power supply of FIG. 3 includes, in addition to the configuration of the power supply of FIG. 1, a P-channel MOS transistor M3, an averaging circuit (AVE) 12, and a comparator 13, which cooperatively detect the light load. The transistor M3 is coupled to the first switch M1 at their gates in common, thus making up a mirror circuit. Further, the transistor M3 is designed to have a transistor size at a ratio of 1:m with respect to the first switch M1. Therefore, a detection current Idet being 1/m times the high-side current IoutH of the first switch M1 flows through the transistor M3.

Figure 4:
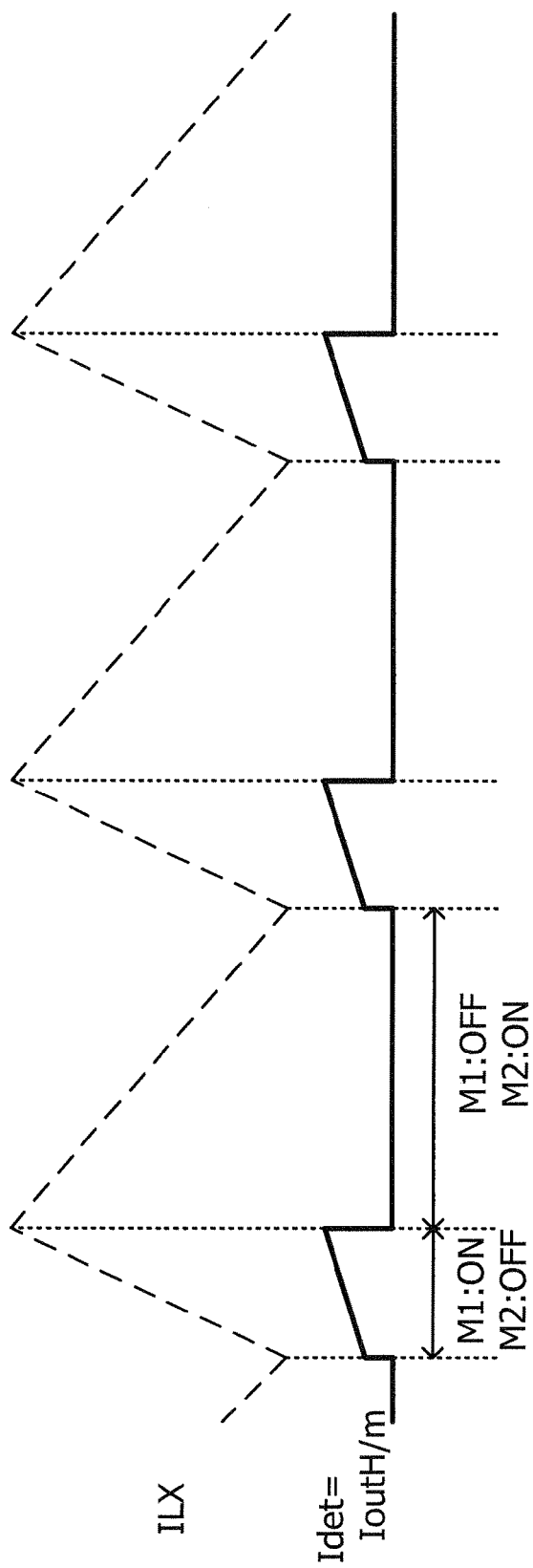
FIG. 4 illustrates the relationship between an inductor current ILX and a detection current Idet.

FIG. 4 illustrates the relationship between the inductor current ILX and the detection current Idet. As illustrated in FIG. 4, the detection current Idet is 1/m times the high-side current IoutH of the first switch M1.

The high-side current IoutH and the inductor current ILX are substantially the same in the first period ton, as illustrated in FIG. 2. Hence, in the case of the heavy load, the turned-on period of the first switch M1 is prolonged and the high-side current IoutH is increased. Conversely, in the case of the light load, the high-side current IoutH is reduced.

Thus, the averaging circuit 12 monitors the high-side current IoutH through the detection current Idet to detect a decrease of an average current within a given period. For example, the averaging circuit 12 converts the detection current Idet to a voltage, and the comparator 13 compares the converted voltage with a reference voltage Vb. When the detection current Idet decreases and the output voltage of the averaging circuit 12 decreases to below the reference voltage Vb, an output of the comparator 13 is reversed, whereupon the light load is detected. In response to the reversal of the output of the comparator 13, the oscillator 17 stops the oscillation and the comparative voltage generator 16 stops the generation of the sloped voltage Vslope, whereupon the comparative voltage Vslope is set to a low voltage, for example. As a result, the on-control of the first switch M1 is stopped and a low consumption current mode is established.

When the on-control of the first switch M1 is stopped, electric charges are no longer supplied to the inductor LOUT, and the electromagnetic energy accumulated in the inductor LOUT serves to supply electric charges to the load. Therefore, current consumption of the power supply decreases.

In the power supply illustrated in FIG. 3, the high-side current IoutH is monitored and a shift to the low consumption current mode is made upon detection of the light load. However, there are two difficulties in the power supply of FIG. 3. First, although it is required to reduce the transistor size ratio 1:m of the mirror circuit to be as small as possible (e.g., m=1000) for minimizing the detection current Idet, a difficulty arises in obtaining high relative accuracy from the viewpoint of layout. Secondly, it is difficult to accurately detect the load current (high-side current) IoutH due to the presence of offset errors in the averaging circuit 12 for converting a current to a voltage and in the comparator 13, an inductance error in the inductor LOUT, variations of input/output voltages, etc. Further, the averaging circuit 12 is poor in response and is not suitable for a high-speed response.

Figure 5:
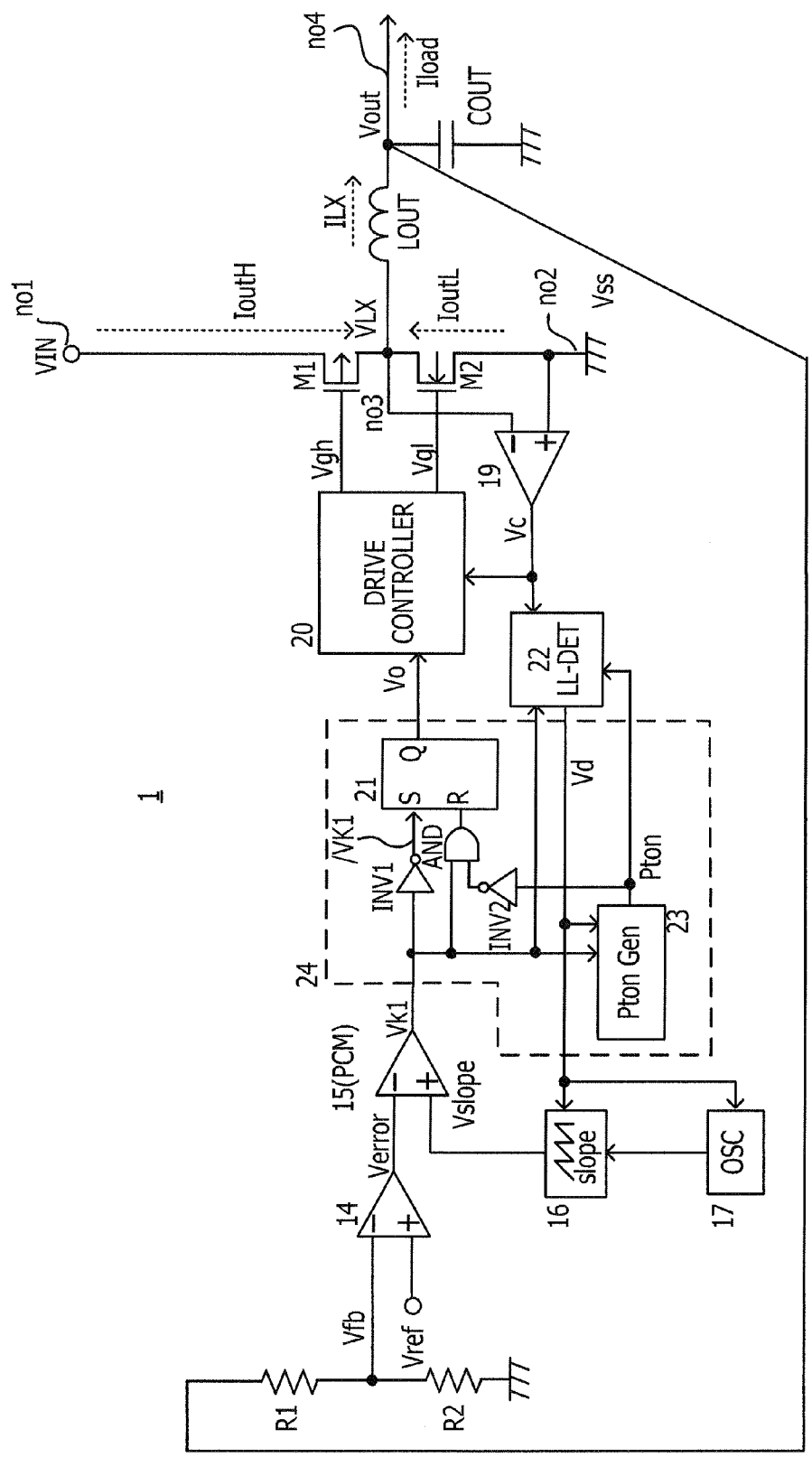
FIG. 5 illustrates another power supply.

FIG. 5 illustrates a power supply according to an embodiment. The power supply of FIG. 5 includes, in addition to the configuration of the power supply of FIG. 1, a second comparator 19 for comparing respective voltages at the junction node n03 and a node n02 of the reference voltage Vss with each other, a light load detector (LL-DET) 22 for detecting the light load based on a detection signal Vc from the second comparator 19, and a control signal generator 24 for generating a drive control signal Vo in response to an output pulse Vk1 of the first comparator 15. The remaining configuration is substantially the same as that of the power supply of FIG. 1.

The power supply of the embodiment is designed in view of the following point. In the light load state, as described above with reference to FIG. 2, the inductor current ILX decreases and becomes a minus current so that the low-side current LoutL of the second switch M2 flows from the junction node n03 to the reference voltage node n02. As a result, the junction voltage VLX is changed from a negative voltage to a positive voltage. Stated another way, the second comparator 19 compares the junction voltage VLX with the reference voltage Vss and detects that VLX≧Vss is satisfied when the second switch M2 is turned on, thereby generating a detection pulse Vc. In accordance with the detection pulse Vc, the light load detector 22 outputs a light load detection signal Vd (=H level), which indicates that the light load state exists, when a certain condition (described later) is satisfied. Also, in accordance with another detection pulse Vc, the light load detector 22 outputs a light load detection signal Vd (=L level), which indicates that the light load state does not exist, when a certain condition (described later) is satisfied.

The control signal generator 24 generates the control signal Vo in response to the output pulse Vk1 from the first comparator 15 and outputs the control signal Vo to the drive controller 20. In the regular load state, the control signal generator 24 generates the control signal Vo having the same pulse width as that of the output pulse Vk1. However, the control signal generator 24 controls the pulse width of the control signal Vo to keep the pulse width from becoming narrower than a given minimum pulse width. To that end, in the control signal generator 24, a ton pulse Pton having a given pulse width is generated and the output pulse Vk1 or the ton pulse Pton, whichever has a larger pulse width, is output as the control signal Vo. For example, a ton pulse generator (Pton Gen) 23 generates, in response to the output pulse Vk1, the ton pulse Pton having a predefined minimum pulse width. Further, an SR flip-flop 21, inverters INV1 and INV2, and an AND gate AND cooperate so as to output either the output pulse Vk1 or the ton pulse Pton, whichever has a larger pulse width, as the control signal Vo. The detailed operation of the control signal generator 24 will be described later.

The comparative voltage generator 16 generates the comparative voltage Vslope, which is made up of a sloped signal having the same cycle as that of the oscillation signal of the oscillator 17, in the regular mode in which the light load is not detected. The comparative voltage generator 16 also generates a fixed comparative voltage in response to the light load detection signal Vd in the low consumption current mode after the light load has been detected. In the light load mode, therefore, currents consumed by the oscillator 17 and the comparative voltage generator 16 are reduced. Further, because the control signal generator 24 generates the drive control pulse Vo having the same pulse width as that of the ton pulse Pton which has the minimum pulse width, the cycle at which the first switch M1 is turned on in the light load mode becomes longer than the cycle T1 in the regular mode due to a reduction of the load. Thus, the number of times of switching is reduced and higher efficiency is realized. In addition, by selectively changing the minimum pulse width of the ton pulse Pton to a larger width in the light load mode, the cycle at which the first switch M1 is turned on in the light load mode becomes longer than the cycle T1 may be made longer than the cycle in the regular mode.

As in the power supply of FIG. 1, the drive controller 20 generates the gate drive signals Vgh and Vgl in accordance with the drive control signal Vo so that the first and second switches M1, M2 are controlled to be alternately turned on and off. Further, in response to the detection signal Vc from the second comparator 19, the drive controller 20 performs control so that the inductor current ILX is kept from becoming a negative current, e.g., that the low-side current IoutL of the second switch M2 is kept from flowing from the junction n03 to the reference voltage node n02. Such control is called discontinuous current mode (DCM) control.

The DCM control prevents the inductor current ILX from flowing reversely in the case of the light load and further prevents the electric charges accumulated in the capacitor COUT from being wastefully discarded. Thus, the DCM control may contribute to lower current consumption.

As described above, the embodiment of FIG. 5 has the following advantages. First, the junction voltage VLX is monitored and the light load state is detected depending on a level of the junction voltage VLX. Accordingly, detection sensitivity is high and a high-speed response is enabled. Secondly, when the light load state is detected, the shift to the low consumption current mode is made, and the generation of the sloped current by the comparative voltage generator 16 is stopped for change to the fixed comparative voltage Vslope. At that time, the oscillator 17 may be stopped simultaneously. Hence, further saving of electric power may be realized. Thirdly, since the drive controller 20 performs the DCM control to turn off the transistor M2 in response to the detection signal Vc, even further saving of electric power may be realized. Fourthly, since the minimum pulse width during which the first transistor M1 is turned on is prolonged in the low consumption current mode as compared with the regular mode, the cycle at which the first transistor M1 is turned on may be prolonged and switching loss may be suppressed.

Figure 6:
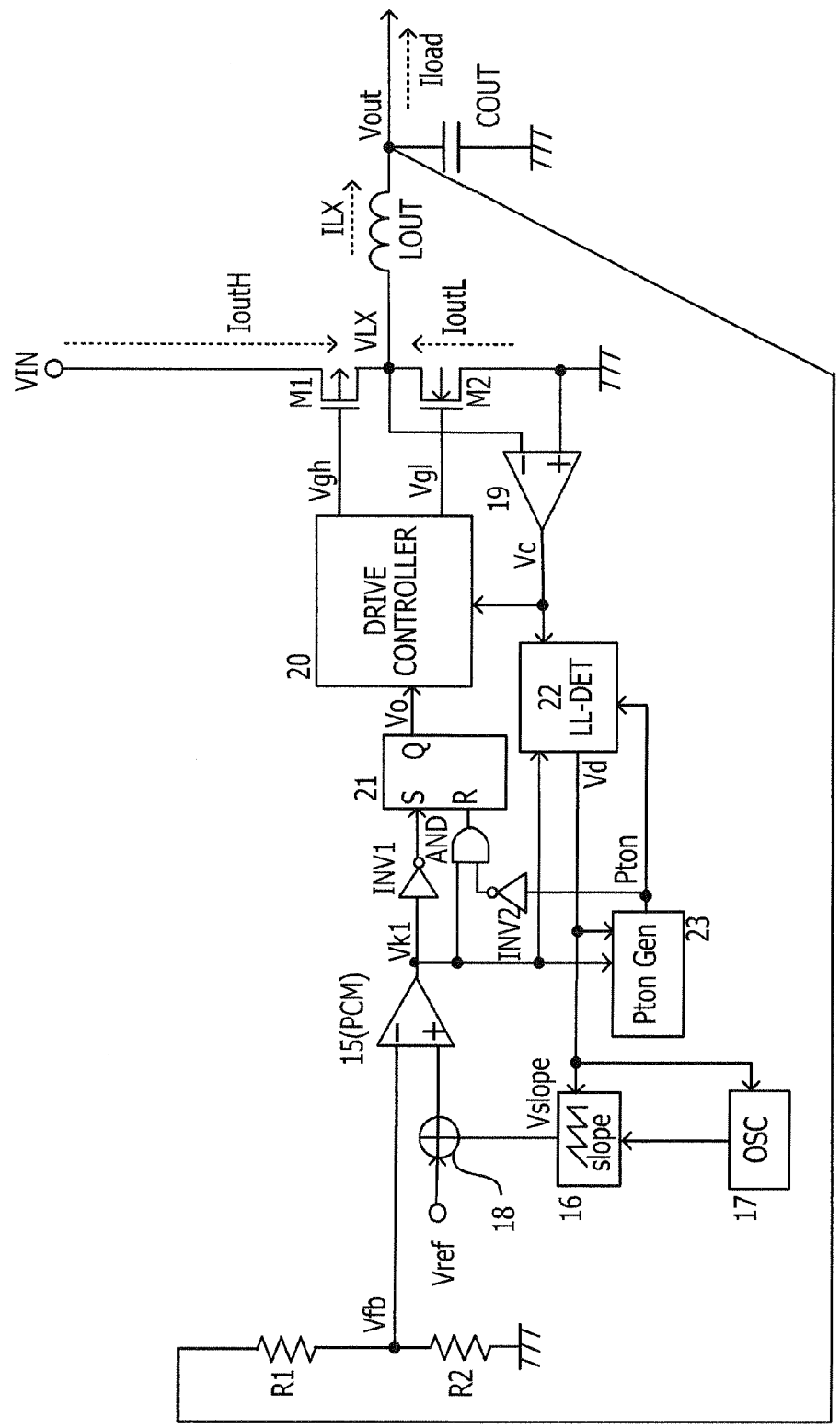
FIG. 6 illustrates a modification of the other power supply.

FIG. 6 illustrates the configuration of a power supply according to a modification of the embodiment. The power supply of FIG. 6 differs from the power supply of FIG. 5 in that the first comparator 15 compares a voltage, which is generated from an adder 18 as the sum of the target reference voltage Vref and the comparative voltage Vslope, with the feedback voltage Vfb. The other configuration is the same as that in FIG. 5. In the case of FIG. 5, the first comparator 15 compares the error Verror between the feedback voltage Vfb and the target reference voltage Vref with the comparative voltage Vslope. On the other hand, in the case of FIG. 6, the first comparator 15 compares the feedback voltage Vfb with (Vref+Vslope). In any case, the first comparator 15 detects whether the output voltage Vout is higher or lower than the target voltage.

[Discontinuous Current Mode (DCM) Control]

Figure 7:
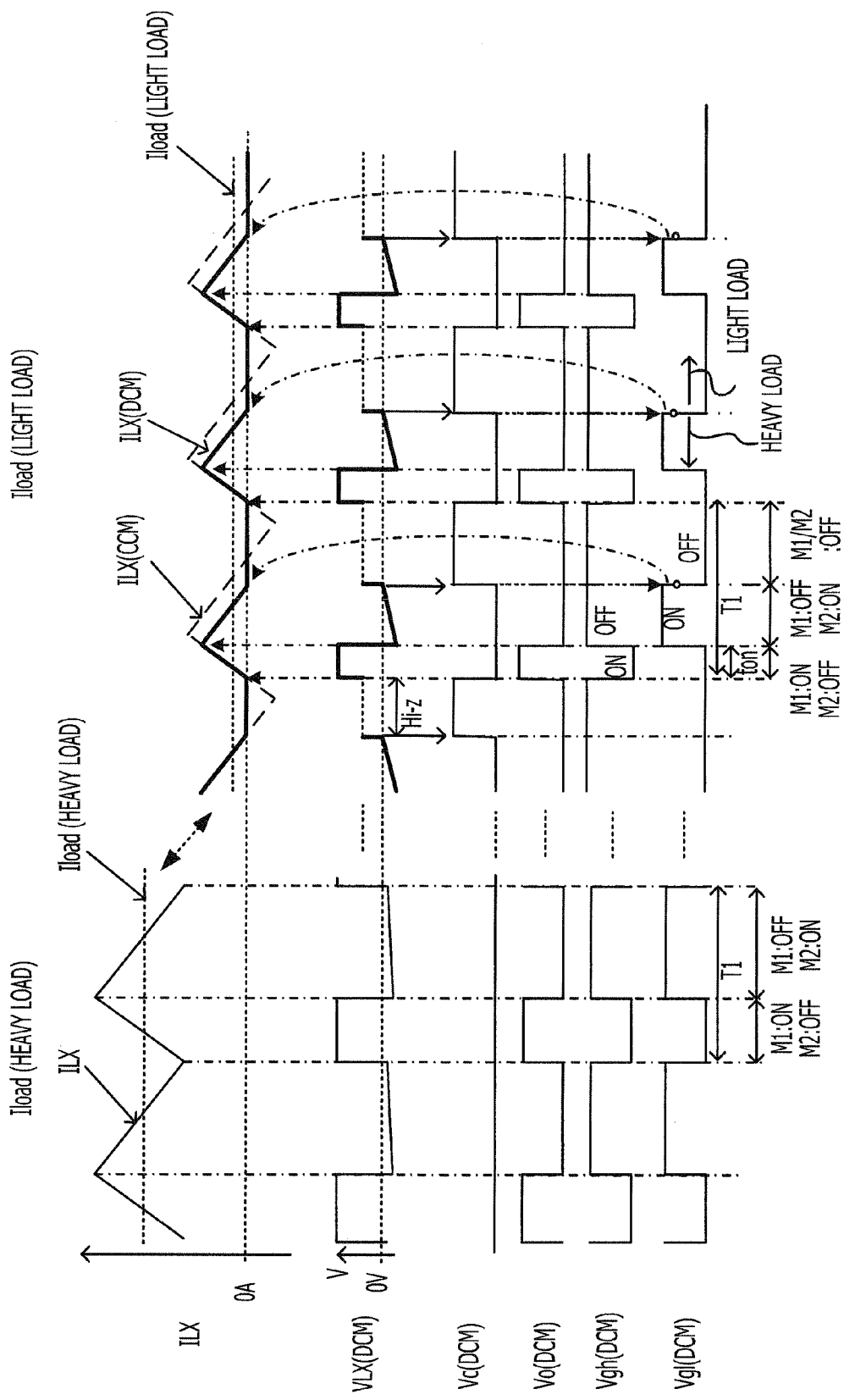
FIG. 7 illustrates timing charts (No. 1) representing the operations of the power supply of FIG. 5 and the power supply of FIG. 6.

FIG. 7 illustrates timing charts (No. 1) representing the operations of the power supply of FIG. 5 and the power supply of FIG. 6. In FIG. 7, the left side represents the heavy load state, and the right side represents the light load state. In the heavy load state, as described above with reference to FIG. 2, the inductor current ILX is sufficiently higher than zero amperes (0 A) so that the inductor current ILX is kept from flowing reversely and from becoming negative. Stated another way, the low-side current IoutL of the second switch M2 flows in the direction from the reference voltage node n02 (reference voltage Vss) to the junction n03 (the junction voltage VLX), and the junction voltage VLX is a negative voltage when the second switch M2 is in the turned-on state. Accordingly, the detection signal Vc of the second comparator 19 maintains an L level. Further, in accordance with the drive control signal Vo, the drive controller 20 generates the gate drive signals Vgh and Vgl each having a phase in reverse to the drive control signal Vo so that the first switch M1 is turned on and the second switch M2 is turned off in the first period of the cycle T1, and that the first switch M1 is turned off and the second switch M2 is turned on in the second period of the cycle T1.

On the other hand, in the light load state, the inductor current ILX decreases and becomes a negative current (reversed current) during the regenerative operation of the inductor. As described above with reference to FIG. 2, when the inductor current ILX becomes negative during a period in which the second switch M2 is turned on in the second period of the cycle T1, the electric charges accumulated in the capacitor COUT, coupled to the output terminal n04, is wastefully discarded to the ground Vss side. To avoid such a situation, when the second comparator 19 detects that the junction voltage VLX has reached the reference voltage Vss and then shifts the detection signal Vc to an H level in the state of the second switch M2 being turned on, the drive controller 20 accordingly forcibly shifts the low-side gate drive signal Vgl to an L level. As a result, the second switch M2 is turned off and the inductor current ILX may be prevented from flowing reversely. In other words, when the second switch M2 is turned off, the inductor current ILX is maintained at zero amperes without becoming negative.

On the light load side of FIG. 7, the inductor current ILX takes a waveform represented by a broken line in the case of continuous current mode (CCM) control and takes a waveform represented by a solid bold line in the case of discontinuous current mode (DCM) control. The waveform represented by the broken line is the same as that in FIG. 2. In the DCM control represented by the solid bold line, the first switch M1 is turned on and the second switch M2 is turned off in the first period ton of the cycle T1. In the second period, the first switch M1 and the second switch M2 are initially turned on and off, respectively, and then turned off and off, respectively. Stated another way, when the detection signal Vc becomes an H level, the drive controller 20 accordingly shifts the low-side gate drive signal Vgl to an L level. As a result, the inductor current ILX is shut off and the discontinuous current mode (DCM) control is performed.

In the DCM control illustrated in FIG. 7, the inductor current ILX=0 is detected upon the junction voltage VLX reaching zero from a minus level during a period in which the second switch M2 is turned on. By utilizing the detection signal Vc thus generated, the light load state is detected, as described below, in this embodiment.

The condition for the inductor current ILX to become zero is ton<(Vout/VIN)*T1 as compared with ton=(Vout/VIN)*T1, expressed by the above formula (1), in the equilibrium state. Further, a slope dILX of the inductor current ILX during the period in which the first switch M1 is turned on is given by:

$$dILX=(Vin-Vout)/L \quad (2)$$

Accordingly, an average value Iload of the load current, which is caused by the first switch M1 flowing during the time ton, is expressed by the following formula, e.g., a value resulting from multiplying a peak current value, obtained by multiplying the slope dILX by the time ton, by the time ton, taking a half of the product, and further dividing the half by the time ton:

$$Iload=dILX*ton*ton/2=(Vin-Vout)/L*(ton/2) \quad (3)$$

When a current in excess of the load current Iload is consumed on the load side, the inductor current ILX=0 is detected. Thus, the load current represents a boundary condition as to whether the DCM control is performed or not.

[Regular Mode and Low Consumption Current Mode]

Figure 8:
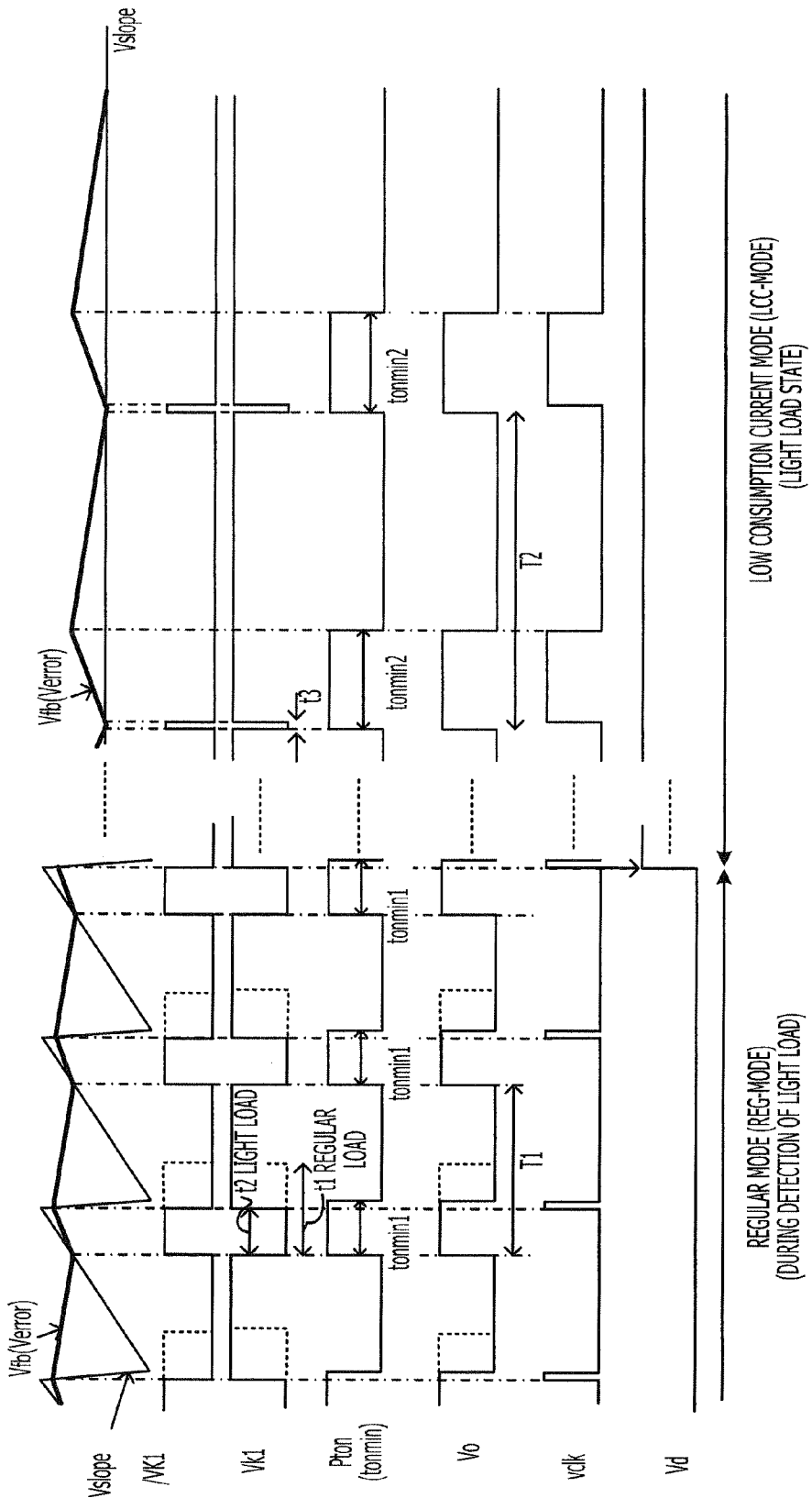
FIG. 8 illustrates timing charts (No. 2) representing the operations of the power supply of FIG. 5 and the power supply of FIG. 6.

FIG. 8 illustrates timing charts (No. 2) representing the operations of the power supply of FIG. 5 and the power supply of FIG. 6. In FIG. 8, the left side represents the regular mode REG-MODE, and the right side represents the low consumption current mode LCC-MODE, i.e., the light load state. In the regular mode, because the comparative voltage Vslope is the sloped voltage of the certain cycle T1, the first comparator 15 generates the output pulse Vk1 of the certain cycle. The output pulse Vk1 has a logical level reversal to that of the output pulse Vo in FIGS. 1 and 2. An output signal /Vk1 from an inverter INV1 in FIG. 5 has the same logical level as that of the output pulse Vo in FIGS. 1 and 2, and it is also illustrated in FIG. 8. The first comparator 15 compares the error voltage Verror (in the case of FIG. 5) or the feedback voltage Vfb (in the case of FIG. 6) with the comparative voltage Vslope. Accordingly, an L pulse of the output pulse Vk1 from the first comparator 15 has a longer pulse width as indicated by a dotted line in the regular load state and a shorter pulse width as indicated by a solid line in the light load state.

On the other hand, in the drive control signal generator 24, the ton pulse generator 23 generates a ton pulse Pton, which has a predefined minimum pulse width tonmin1, in response to the output pulse Vk1. Further, the RS flip-flop 21 is set at a rising edge of the reversed output pulse /Vk1 of the output pulse Vk1 to shift the drive control signal Vo to an H level, and is reset on condition of the output pulse Vk1=H and the ton pulse Pton=L, i.e.,/Vk1=L and Pton=L, to shift the drive control signal Vo to an L level. Thus, the drive control signal Vo is controlled so as to have a pulse width that is substantially equal to a longer pulse width between the L pulse of the output pulse Vk1 from the first comparator 15 and the ton pulse Pton.

Accordingly, in the regular load state, the drive control signal Vo has the same pulse width as that of the output pulse Vk1 from the first comparator 15, e.g., a PWM comparator, and the first switch M1 is turned on due to the pulse width. Also, in the light load state, although the pulse width of the output pulse Vk1 from the first comparator 15 is narrowed, the drive control signal Vo has substantially the same pulse width as that of the ton pulse Pton having the minimum pulse width tonmin, and the first switch M1 is turned on due to the pulse width. In other words, a minimum value of the pulse width in which the first switch M1 is turned on is indicated by the ton pulse Pton.

In the regular mode REG-MODE, because the inductor current ILX does not become zero during the period in which the second switch M2 is turned on, the light load detection signal Vd remains at the L level. A signal vclk will be described below.

On the other hand, when coming into the light load state, the inductor current ILX frequently becomes zero during the period in which the second switch M2 is turned on. When the detection signal Vc from the second comparator 19 is successively generated upon detection of such a zero current, the light load detector 22 determines that the load is in the light load state, and shifts the light load detection signal Vd to an H level. Such an operation will be described in detail later with the light load detector 22.

Also, when coming into the light load state, the pulse width of the output pulse Vk1 from the first comparator 15 is reduced to be narrower than the minimum pulse width tonmin1. By detecting that the pulse width of the output pulse Vk1 has become narrower than the minimum pulse width tonmin1, the light load detector 22 similarly determines that the load is in the light load state, and shifts the light load detection signal Vd to an H level. Such an operation will be also described in detail later with the light load detector 22.

When the light load detection signal Vd becomes the H level, the control mode is changed to the low consumption current mode LCC-MODE. As illustrated in FIG. 8, the comparative voltage Vslope is set to the fixed voltage in response to the light load detection signal Vd=L. Therefore, the current consumed by the comparative voltage generator 16 and the oscillator 17 are suppressed and the first switch M1 is not controlled to be turned on per period T1 unlike the regular mode. However, whenever the error voltage Verror or the feedback voltage Vfb becomes lower than the comparative voltage Vslope, the first comparator 15 generates the output pulse Vk1 (L pulse). Further, in response to the output pulse Vk1=L, the drive control signal generator 24 shifts the drive control signal Vo to an H level and controls the pulse width of the drive control signal Vo to be a minimum pulse width tonmin2 of the ton pulse Pton. The above-described operation is the substantially same as the operation in the regular mode except for that the minimum pulse width tonmin2 is relatively narrow.

In response to the drive control signal Vo having the minimum pulse width tonmin2, the first switch M1 is turned on in the minimum pulse width tonmin2, and energy is accumulated in the inductor LOUT with the high-side output current IoutH. During the period, the feedback voltage Vfb rises. Further, during a period in which the drive control signal Vo is at the L level, the first switch M1 is turned off and the regenerative operation is performed so as to release the energy accumulated in the inductor LOUT. Accordingly, the feedback voltage Vfb decreases at a slope depending on a load level of the light load. The lighter the load, the gentler is the slope.

Thus, in the low consumption current mode after the detection of the light load, the first switch M1 is turned on in the fixed pulse width that is equal to the minimum pulse width tonmin2 (>tonmin1). Therefore, the first switch M1 is turned on for a longer period than that in the control executed in the regular mode at the cycle T1, and energy is accumulated in the inductor. Further, because the output voltage Vout (feedback voltage Vfb) decreases slowly due to the light load, a cycle at which the first switch M1 is turned on in the low consumption current mode is longer than the cycle T1 in the regular mode.

In other words, the cycle at which the first switch M1 is turned on in the low consumption current mode becomes shorter than the cycle in the regular mode due to not only a decrease of the load, but also an increase of the minimum pulse width tonmin2. As a result, the switching frequency decreases and efficiency of the circuit operation increases. Thus, the timing at which the first switch M1 is turned on in the low consumption current mode is shorter than the timing in the regular mode.

[Ton Pulse Generator]

Figure 9:
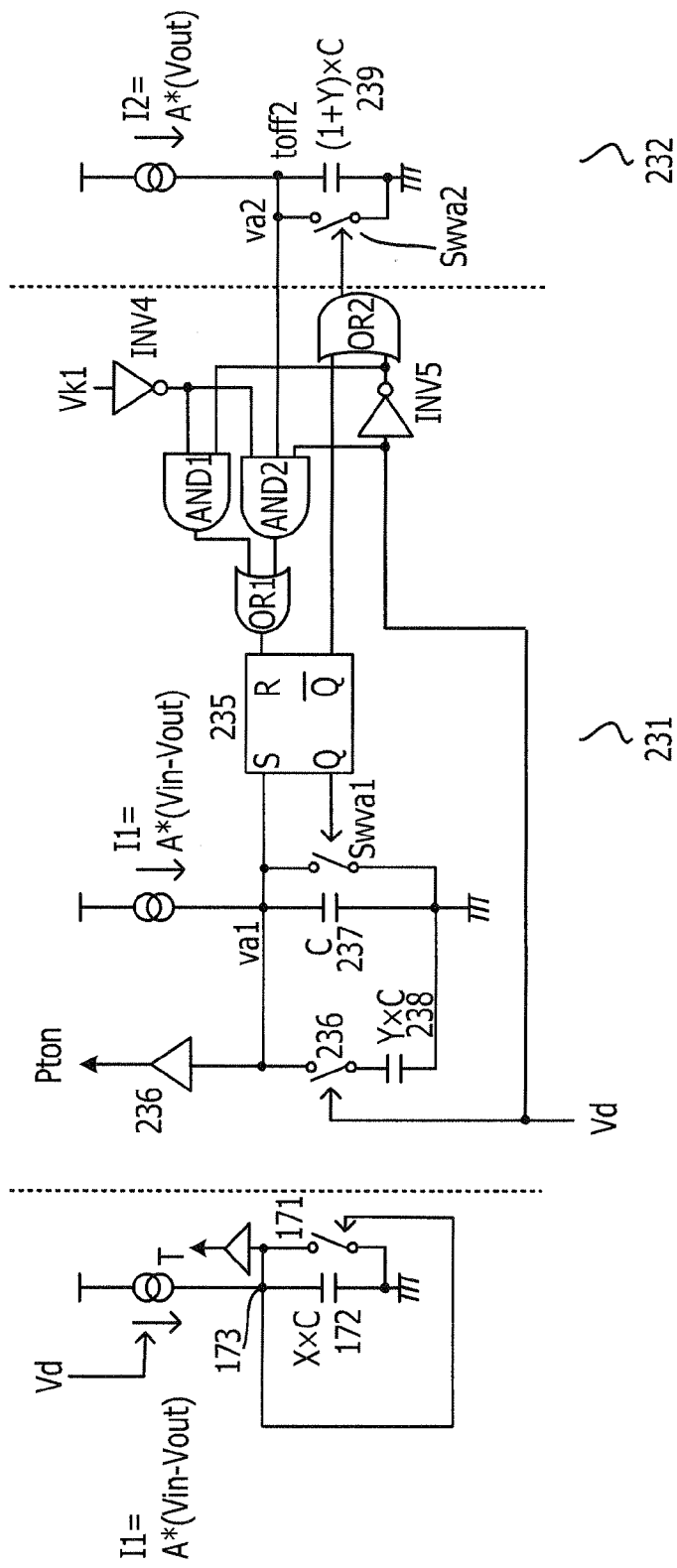
FIG. 9 illustrates a ton pulse generator (Pton Gen) 23 in the power supply of FIG. 5 or the power supply of FIG. 6.
Figure 10:
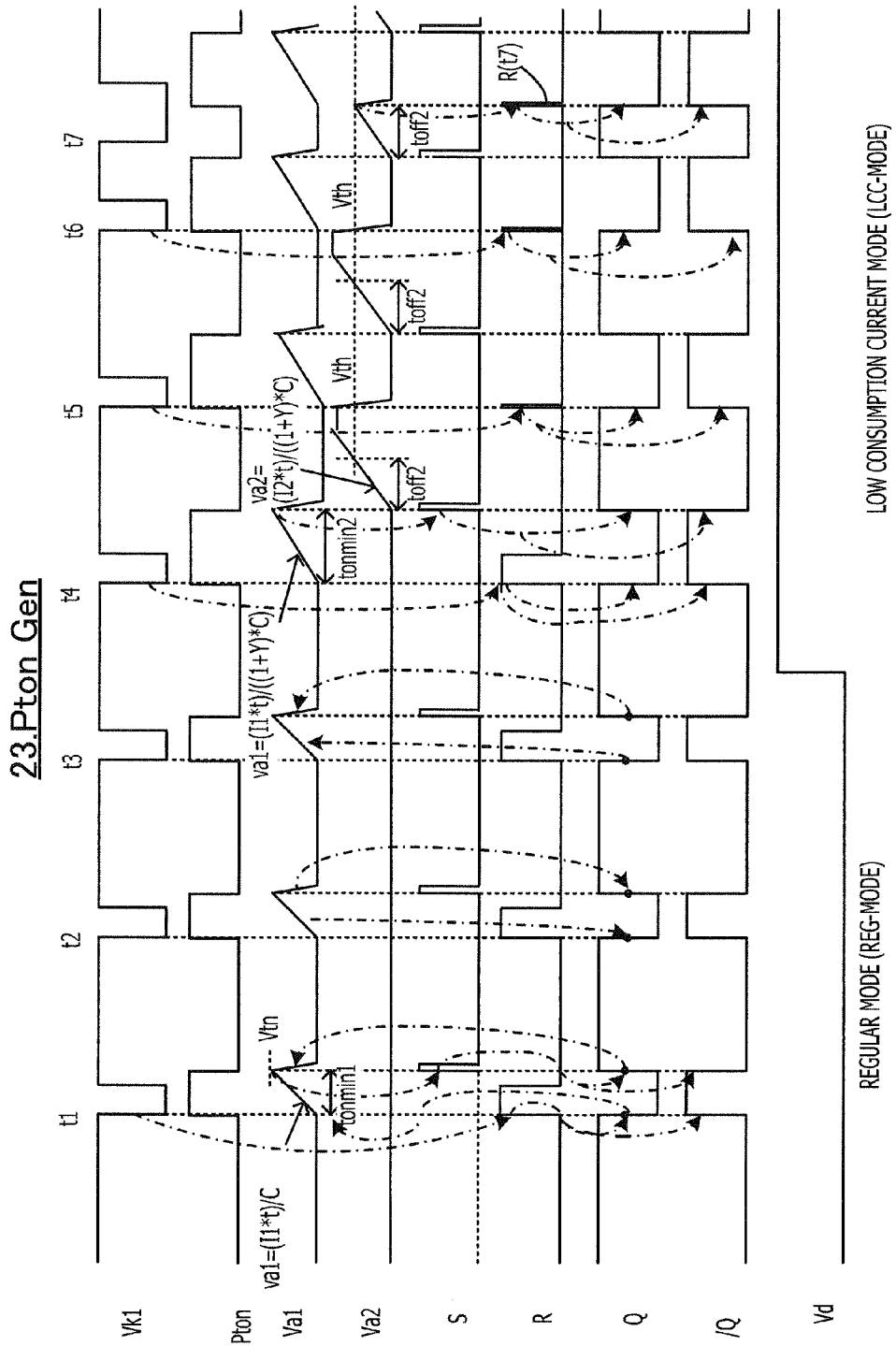
FIG. 10 illustrates timing waveforms representing the operation of the ton pulse generator 23 of FIG. 9.

FIG. 9 illustrates the configuration of the ton pulse generator 23. Also, FIG. 10 illustrates timing waveforms representing the operation of the ton pulse generator 23. In FIG. 8, the pulse width tonmin2 of the ton pulse Pton in the low consumption current mode LCC-MODE is longer than the pulse width tonmin1 of the ton pulse Pton in the regular mode REG-MODE. Therefore, the turning-on cycle of the first switch M1 in the low consumption current mode may be prolonged as described above. Further, a hysteresis characteristic may be provided between the detection of the light load by the light load detector 22 and return to the regular mode.

The ton pulse generator 23 includes a first voltage generator 231 that generates a first voltage va1 for determining the minimum pulse width tonmin of an H level of the ton pulse Pton, and a second voltage generator 232 that generates a second voltage va2 for determining a minimum width toff of an L level of the ton pulse Pton.

In the first voltage generator 231, a current source I1=A*(Vin−Vout) charges a capacitor 237 (or capacitors 237 and 238) during a period in which the switch SWva1 is turned off. When a first voltage va1 becomes an H level, a flip-flop 235 is set and the switch SWva1 is turned on by an output Q=H. Accordingly, the capacitor 237 starts discharge and the first voltage va1 decreases to an L level. A series of the operations is repeated. As a result, the ton pulse Pton is output from a buffer 236. The pulse width of the ton pulse Pton is substantially equal to the period of a triangular wave of the first voltage va1.

On the other hand, in the second voltage generator 232, a current source I2=A*Vout charges a capacitor 239 during a period in which the switch SWva2 is turned off. When a second voltage va1 becomes an H level, the flip-flop 235 is reset and the switch SWva2 is turned on by an output/Q=H. Accordingly, the capacitor 239 starts discharge and the second voltage vat decreases to an L level. A series of the operations is repeated.

Further, in the regular mode, because the light load detection signal Vd is at the L level, the switch 236 is turned off and the first voltage generator 231 charges and discharges the capacitor 237. Also, an output of an inverter INV5 becomes an H level and an output of an OR gate OR2 also becomes an H level. Therefore, the switch SWva2 is turned on and the second voltage generator 232 does not operate. Further, during a period of Vd=L, because the output of the inverter INV5 is at the H level, an AND gate AND2 is held in a stopped state and an AND gate AND1 is held in an active state.

As indicated by a time t1 in FIG. 10, in the first voltage generator 231, the flip-flop 235 is reset in response to the L level of the output pulse Vk1 and the output of the flip-flop 235 becomes Q=L. Therefore, the switch SWva1 is turned off and the capacitor 237 starts to charge with the current from the current source I1. Upon the first voltage va1 reaching the H level, the flip-flop 235 is set which results in Q=H, whereby the switch SWva1 is turned on and the capacitor 237 starts to discharge. Concurrent with the charging and the discharging of the first voltage va1, the ton pulse Pton is generated from the buffer 236. Stated another way, in the regular mode, the ton pulse Pton takes an H level in response to the output pulse Vk1=L and shifts to an L level after the minimum pulse width tonmin1. A cycle of such a level shift is given by "tonmin1" that is determined depending on the capacitance C of the capacitor 237 and the current source I1=A*(Vin−Vout). In other words, the cycle T1 and the minimum pulse width tonmin1 are determined by a current I1 that depends on (Vin−Vout).

In the low consumption current mode, the light load detection signal Vd becomes H. Therefore, the switch 236 is turned on, whereby the capacitors 237 and 238 in the first voltage generator 231 are coupled in parallel and the cycle of the level shift is given by "tonmin2" that is determined depending on the capacitances C+YC of the capacitors 237 and 238 and the current source I1=A*(Vin−Vout). Further, the output of the inverter INV5 becomes an L level. As a result, the AND gate AND1 is brought into a stopped state. Also, the AND gate AND2 is brought into an active state so that, when the output pulse Vk1=L and the second voltage va2=H are both satisfied additionally, an output of AND2 becomes H and the flip-flop 235 is reset. Further, an OR gate OR2 turns on the switch SWva2 in response to/Q=H that is due to the second voltage va2 becoming H. Thus, the second voltage va2 is charged and discharged at a cycle toff2.

Consequently, at a time t3 in FIG. 10, the ton pulse Pton is generated through the same operation as the operation at the time t1. At a time t7, however, even when the output pulse Vk1 becomes an L level at an earlier timing than the cycle toff2 of the second voltage va2, the flip-flop 235 is not reset until the second voltage va2 becomes an H level after the cycle toff2. Such a process is as per indicated by R(t7) in FIG. 10. As a result, the L-level period of the ton pulse Pton is limited to the cycle toff2 or longer.

FIG. 9 further illustrates the configuration of the oscillator 17. In the oscillator 17, a capacitor 172 is charged by the current source I1=A*(Vin−Vout). Upon a node 173 becoming an H level, a switch 171 is turned on through an OR gate 170, thus causing discharge from the capacitor 172. As a result, a pulse signal at the cycle T is generated. Additionally, when the light load detection signal Vd becomes an L level, the oscillator 17 stops the oscillation because the current supply is stopped.

The capacitors are designed so that the capacitance of the capacitor 172 is X*C, the capacitances of the capacitors 237 and 238 are respectively C and Y*C, and the capacitance of the capacitor 239 is (1+Y)*C. For example, the capacitances X*C and C determining the cycle T1 and "tonmin1" in the regular mode are set as follows.

$$C:X*C=Vout*Z:Vin \qquad (4)$$

In the formula (4), Z is a value satisfying tonmin1<Vout/Vin.

Also, the minimum pulse widths tonmin1 and tonmin2 are set as follows.

$$tonmin1:tonmin2=C:(1+Y)*C \qquad (5)$$

Further, the pulse width toff2 of the L level of the ton pulse Pton is set based on a current I2=A*Vout that depends on the output voltage Vout.

As described above, in the regular mode, the ton pulse generator 23 generates the ton pulse Pton having the minimum pulse width tonmin1 with the output pulse Vk1 serving as a trigger. In the low consumption current mode, the ton pulse generator 23 generates the ton pulse Pton which has an H level of the minimum pulse width tonmin2>tonmin1 with the output pulse Vk1 serving as a trigger, and which has an L level of at least toff2. Further, in the low consumption current mode, the ton pulse generator 23 generates the ton pulse Pton having the minimum pulse width tonmin2 per toff2 during the period in which the output pulse Vk1 is at the L level.

[Change to Low Consumption Current Mode Upon Detection of Light Load]

Figure 11:
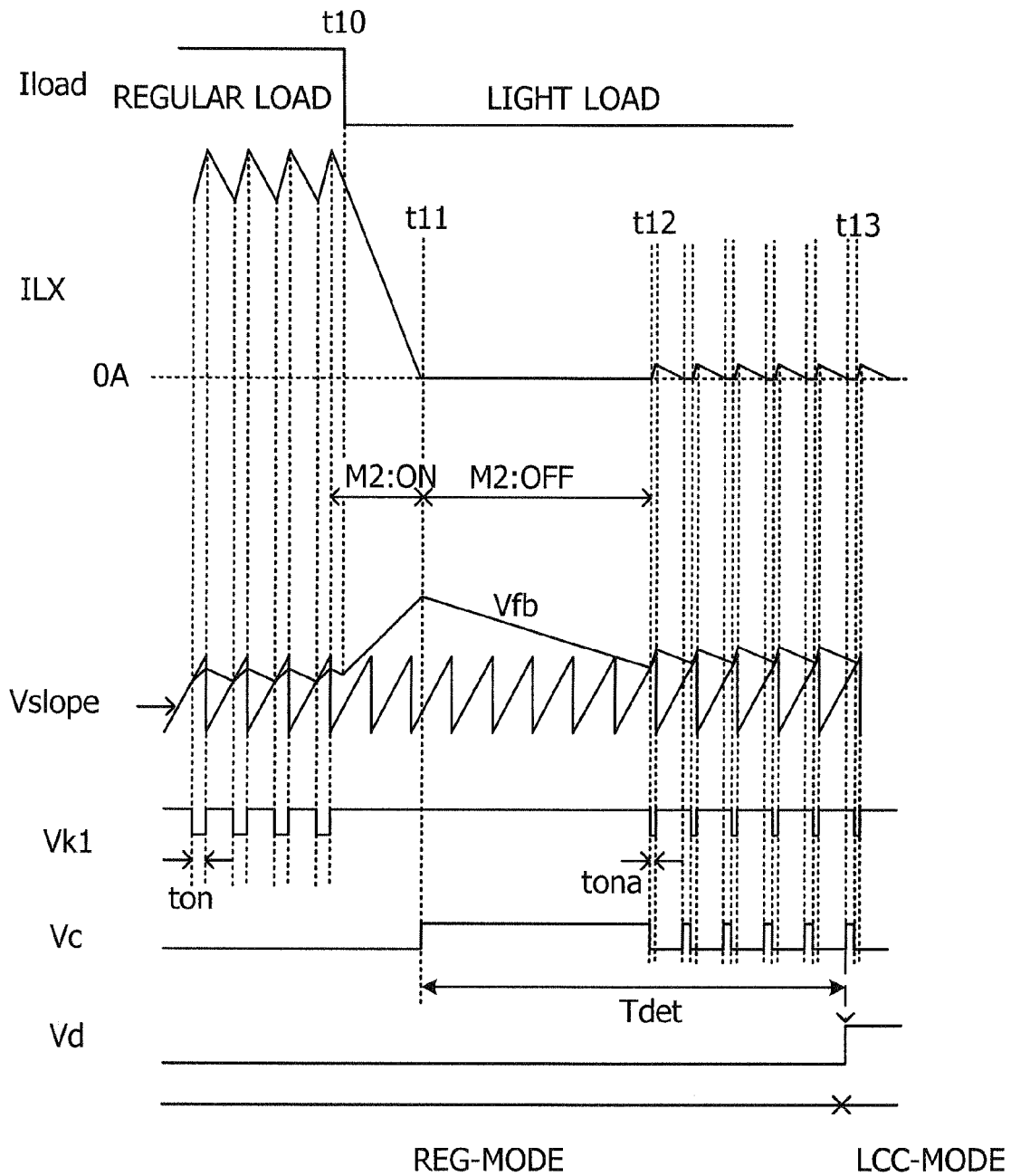
FIG. 11 illustrates timing charts (No. 1) representing the operations when a power control mode is changed from a regular mode to a low consumption current mode in the power supply of FIG. 5 or the power supply of FIG. 6.

FIG. 11 illustrates timing charts (No. 1) representing the operations when the control mode is changed from the regular mode to the low consumption current mode. When the load current Iload is at a level of the regular load, the first switch M1 is turned on at the cycle T1 with the PWM control that is performed by the first comparator 15 comparing the feedback voltage Vfb (or the error voltage Verror) with the sloped voltage Vslope, and the inductor current ILX increases and decreases at a level higher than zero amperes. The operation is generally called a "ripple". As illustrated in FIG. 11, the output pulse Vk1 from the first comparator 15 takes an L level repeatedly at the cycle T1. During a period in which the inductor current ILX is positive, the detection signal Vc from the second comparator 19 is maintained at the L level.

When abruptly coming into the light load state at a time t10, the load current Iload decreases. Correspondingly, the feedback voltage Vfb rises during a period in which the inductor releases energy (during a period of the inductor current ILX>0), and the output pulse Vk1 from the first comparator 15 is maintained at the H level, whereby the turning-on of the first switch M1 at the cycle T1 is stopped and the turned-on state of the second switch M2 is continued. Consequently, the inductor current ILX decreases and then reaches zero amperes at a time t11, whereupon the detection signal Vc becomes an H level. In response to Vc=H, the drive controller 20 controls the second switch M2 to be turned off. This corresponds to the DCM control illustrated in FIG. 7. In a period from the time t11 to t12, the first and second switches M1 and M2 are both maintained in the off-state so that, during the period of t11 to t12, electric charges are supplied to the load from the capacitor COUT and the output voltage Vout decreases gradually.

When the feedback voltage Vfb decreases to the sloped voltage Vslope at the time t11, the switching operation is resumed. This state represents the equilibrium state of the light load. Because of the light load state, however, the output pulse Vk1 from the first comparator 15 has a short pulse width tona. Hence, the amount of electric charges supplied from the first switch M1 is small and the inductor current ILX increases and decreases near a level of zero amperes. Stated another way, when the light load state is stabilized in the equilibrium state, the inductor current ILX reaches zero amperes per cycle T1 and the detection signal Vc becomes an H level. Further, the output pulse Vk1 becomes an L level at the next turning-on timing.

The operation illustrated in FIG. 11 assumes that the generation of the ton pulse Pton by the ton pulse generator 23 is stopped. Accordingly, the pulse width tona of the output pulse Vk1 in the equilibrium state of the light load is not clamped to the minimum pulse width tonmin1. When the pulse width of the control pulse Vo in the equilibrium state of the light load is clamped to the minimum pulse width tonmin1, more energy than desired for the load is applied to the inductor and an operation causing the feedback voltage Vfb to exceed the sloped voltage Vslope is generated as illustrated in FIG. 11, whereby the on-cycle of the first switch M1 becomes longer than the cycle T1. Thus, by performing, in the regular mode, fixed on-control in which the on-period of the first switch M1 is clamped to the minimum pulse widths tonmin1, it is possible to thin out the operations of turning on the first switch M1 in the light load state and to increase efficiency.

In consideration of the operations illustrated in FIG. 11, when the operation repeating the detection signal Vc=H and the output pulse Vk1=L is successively generated a plurality of times, the light load detector 22 in this embodiment determines that the light load state is present, and shifts the light load detection signal Vd to an H level. In an example of FIG. 11, the light load detection signal Vd is shifted to the H level at a time t13 when Vc=H is obtained six times. Thus, the light load is detected after a time Tdet has elapsed from the first Vc=H. As a result, the light load detector 22 may avoid the control mode from being changed to the low consumption current mode with such an unintended slight load variation that, after the load has come into the light load state at the time t10 and the inductor current ILX has temporarily become zero, the load is returned to the regular load state again.

[Light Load Detector (1)]

Figure 12:
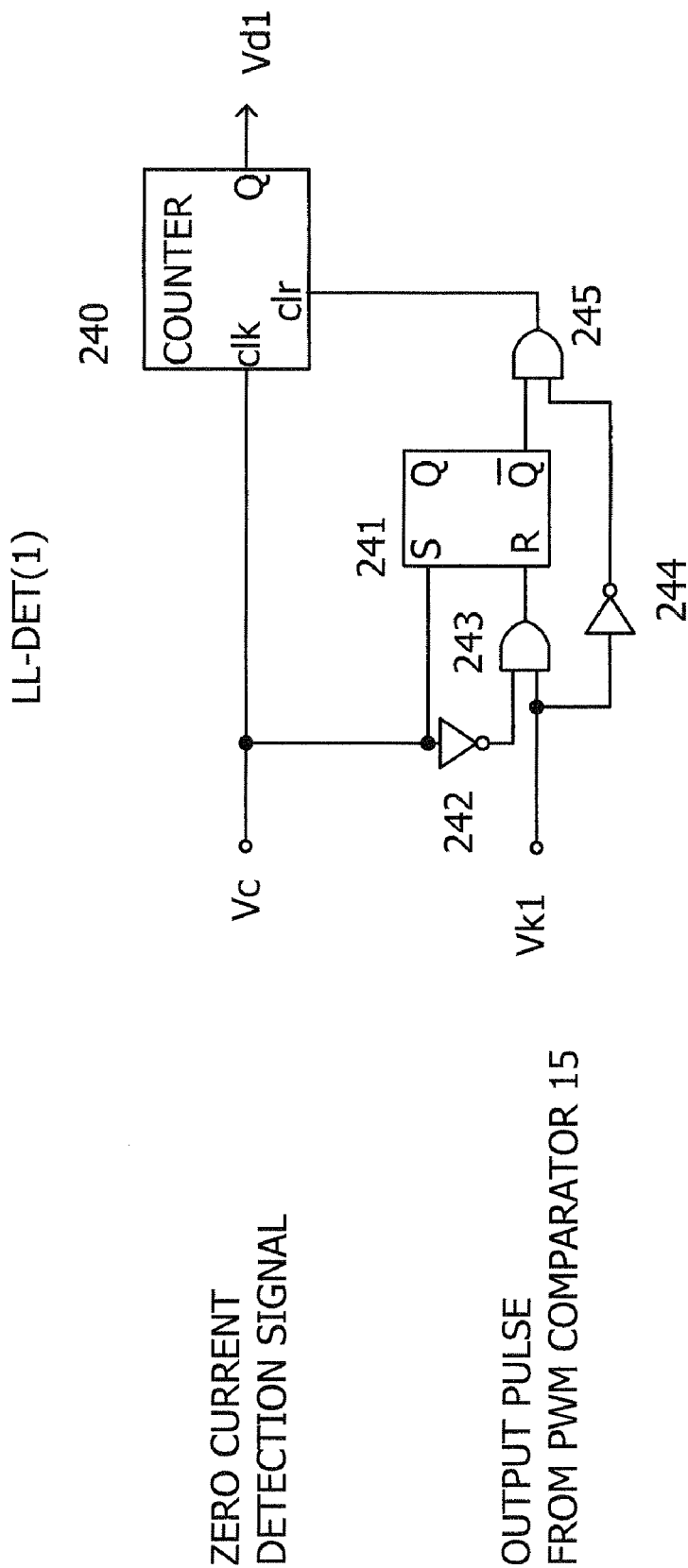
FIG. 12 illustrates a first example of a light load detector (LL-DET) 22 in the power supply of FIG. 5 or the power supply of FIG. 6.

FIG. 12 illustrates a first example of the light load detector. The illustrated light load detector LL-DET(1) is a circuit for detecting the light load state during the regular mode in FIG. 11. The light load detector LL-DET(1) includes a counter 240 for counting the H level of the detection signal Vc, which is a result of detecting that the inductor current has become zero, and an AND gate 245 for masking the counter 240 from being cleared by the output pulse Vk1=L immediately after the detection of the zero current. Gates 242, 243, and 244 and a flip-flop 241 have the function of clearing the counter 240 in response to the output pulse Vk1=L in the regular mode, and of preventing the counter from being cleared by the output pulse Vk1=L during the detection of the light load.

Figure 13:
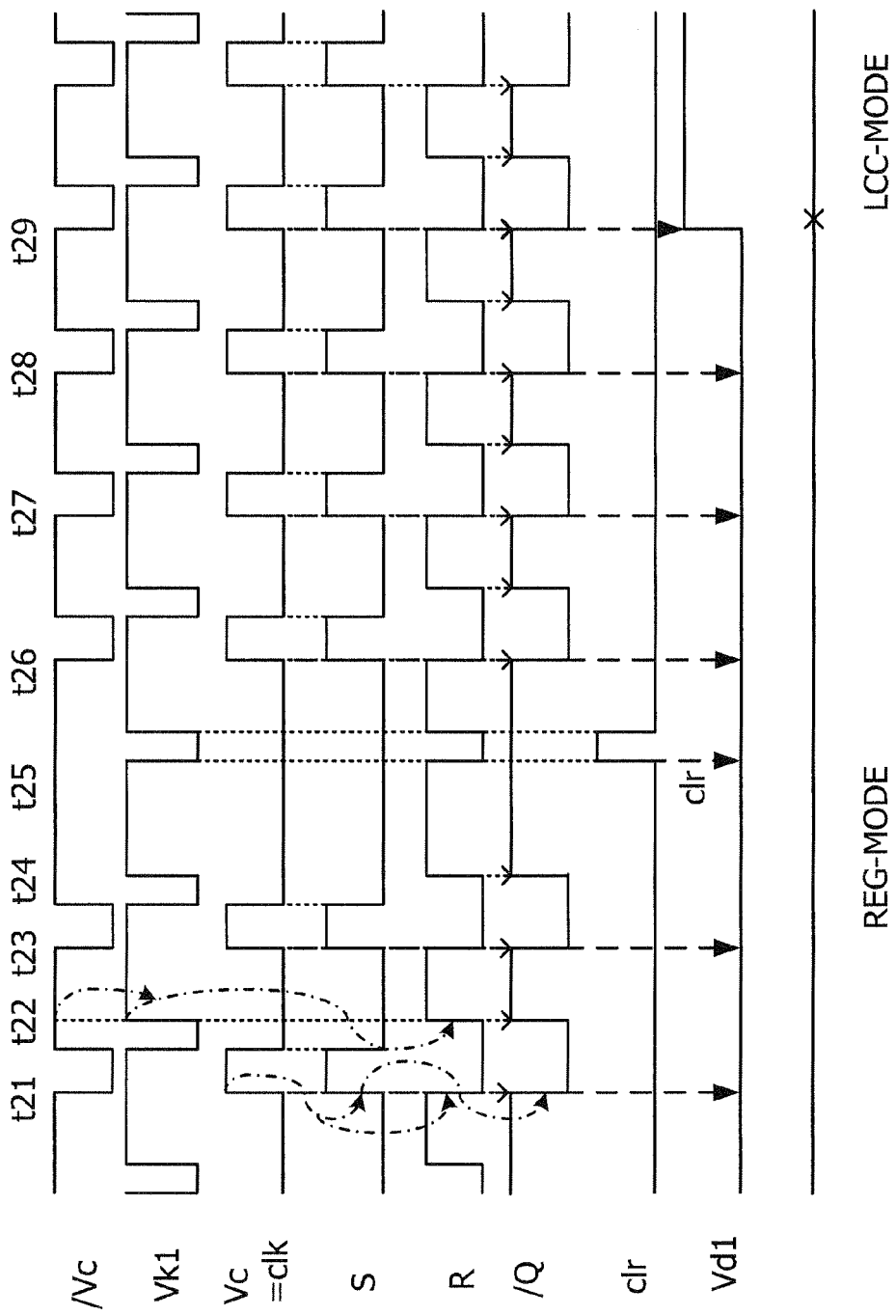
FIG. 13 illustrates timing charts representing the operation of the light load detector 22 of FIG. 12.

FIG. 13 illustrates timing charts representing the operation of the light load detector of FIG. 12. When coming into the light load state in the regular mode, the inductor current ILX becomes zero at a time t21 and the detection signal Vc=H is generated. Therefore, the counter 240 makes a count-up, the flip-flop 241 is set to provide an output/Q=L, and the AND gate 245 is brought into a blocked state. Accordingly, an H-level output of the inverter 244, which is to be provided by the output pulse Vk1=L at a time t22 immediately after the time t21, is blocked by the AND gate 245 and the counter 240 is not cleared. Similar operations are performed at times t23 and t24.

At a time t25, however, the load is returned to the regular level, whereby Vc=H is not generated and Vk1=L is generated. Therefore, the flip-flop 241 is not reset to continuously hold/Q=H, and the counter 240 is cleared in response to Vk1=L through the AND gate 245. In other words, when the load is at the regular level and the inductor current ILX=0 is not generated, the counter 240 is cleared per Vk1=L. As a result, the light load state is not detected with a slight load variation.

During a period from a time t26 to t28, the counter 240 counts up Vc=H whenever Vc=H and Vk1=L are repeated again. When the counter 240 counts up Vc=H at a time t29, the light load detector LL-DET(1) shifts a light load detection signal Vd1 to an H level. Thus, in the first example of FIG. 12, the light load state is detected when Vc=H is successively detected four times.

[Light Load Detector (2)]

Figure 14:
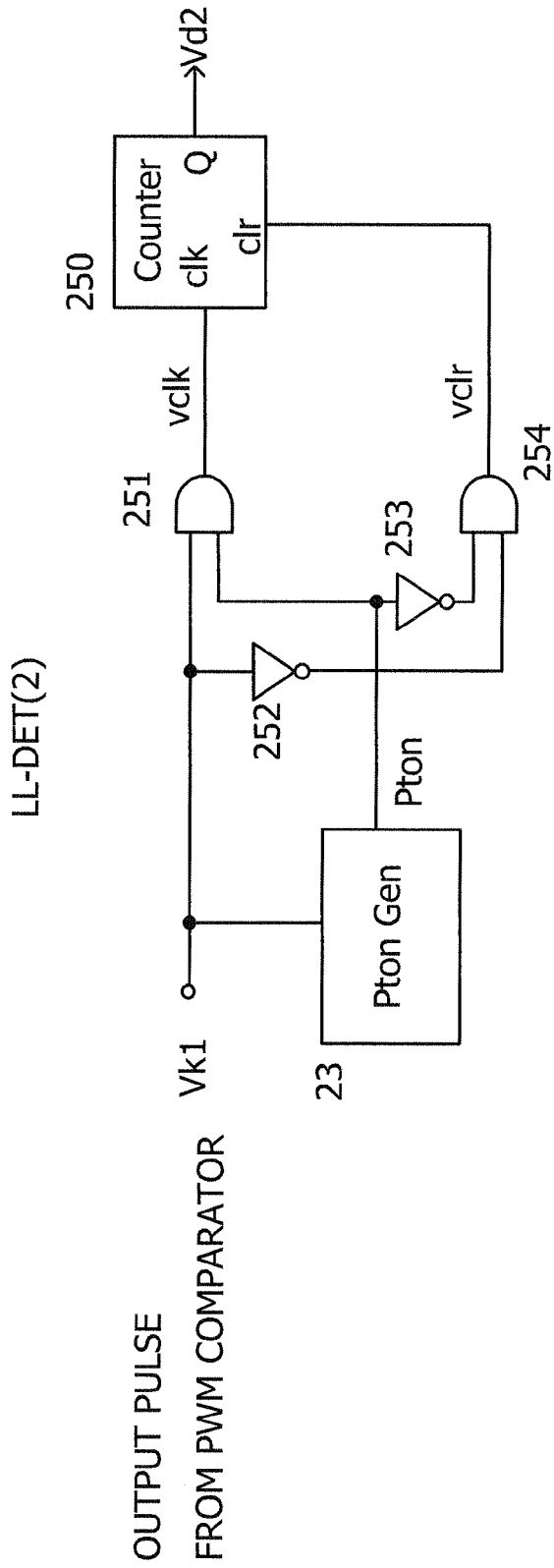
FIG. 14 illustrates a second example of the light load detector 22 in the power supply of FIG. 5 or the power supply of FIG. 6.

FIG. 14 illustrates a second example of the light load detector. The illustrated light load detector LL-DET(2) is also a circuit for detecting the light load state during the regular mode in FIG. 11. Unlike the first example of FIG. 12, the second example does not utilize the detection signal Vc resulting from detecting that the inductor current ILX has become zero. The second example detects that the output pulse Vk1 from the first comparator 15 has a wider pulse width in the regular load state and has a narrower pulse width in the light load state. For example, the light load detector LL-DET(2) determines the presence of the light load state when the output pulse Vk1 has become narrower than the pulse width tonmin1 of the ton pulse Pton.

The light load detector LL-DET(2) includes a counter 250 for making a count-up when the pulse width of output pulse Vk1 is narrower than the pulse width tonmin1 of Pton, and for clearing the count when the pulse width of output pulse Vk1 is wider than the pulse width tonmin1. Gates 250 to 254 cooperate with the counter 250 so as to perform such an operation.

Figure 15:
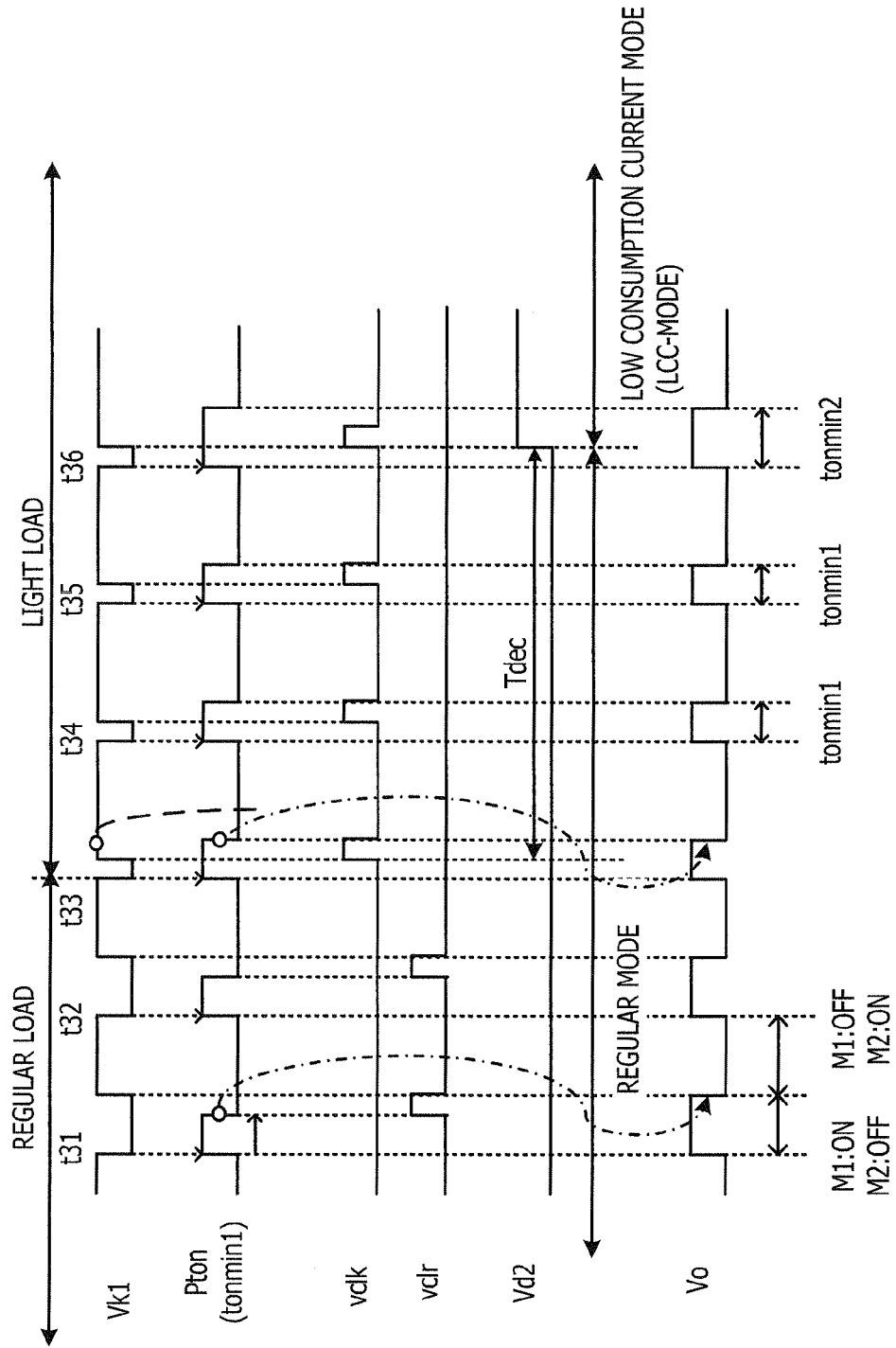
FIG. 15 illustrates timing charts representing the operation of the light load detector 22 of FIG. 14.

FIG. 15 illustrates timing charts representing the operation of the light load detector of FIG. 14. During a period including times t31 and t32, because of the regular load, the pulse width of output pulse Vk1 is wider than the pulse width tonmin1 of Pton. Therefore, a clear signal vclr becomes an H level and the counter 250 is cleared per cycle T. During a period including times t33 and t36, because the load state is changed to the light load, the pulse width of output pulse Vk1 is narrower than the pulse width tonmin1 of Pton. Therefore, the AND gate 251 shifts a clock signal vclk to an H level so that the counter 250 conducts a count-up. In the illustrated example, an output Q of the counter 250 is shifted to an H level when the counter 250 conducts a count-up four times, and a light load detection signal Vd1 takes an H level indicating the detection of the light load. Thus, the light load detector LL-DET(2) outputs the light load detection signal Vd2=H after a time Tdec has elapsed from the change to the light load state.

Once the light load detection signal Vd2=H is output, the ton pulse generator 23 widens the pulse width of the ton pulse Pton to be tonmin2>tonmin1, as described above with reference to FIG. 9. This is effective in making it difficult to detect the regular load after the light load state has been once detected, and in giving a hysteresis characteristic to the operation of detecting the light load by the light load detector LL-DET(2) and hence increasing stability in the control. Further, by setting the pulse width of the ton pulse Pton to be relatively wide, i.e., tonmin2>tonmin1, the on-cycle of the first switch M1 in the low consumption current mode is made longer than in the regular mode.

The duty ratio in the regular load state is expressed as per the above-mentioned formula (1):

ton=(Vout/Vin)*T1

In the light load detector of the second example, the presence of the light load state is determined when the output pulse Vk1 has become shorter than the minimum pulse width tonmin1, by producing tonmin1<ton=(Vout/Vin)*T1.

The light load detector 22 in this embodiment may include both the light load detectors LL-DET(1) and LL-DET(2) of FIGS. 12 and 14 so that the light load detection signal Vd is shifted to the H level when any of the light load detectors detects the light load. In such a case, the logical sum of the light load detection signals Vd1 and Vd2 from the light load detectors LL-DET(1) and LL-DET(2) is output as the light load detection signal Vd. The arrangement enables the light load state to be detected with higher reliability.

[Operation for Return to Regular Mode]
[Light Load Detector (3)]

Figure 16:
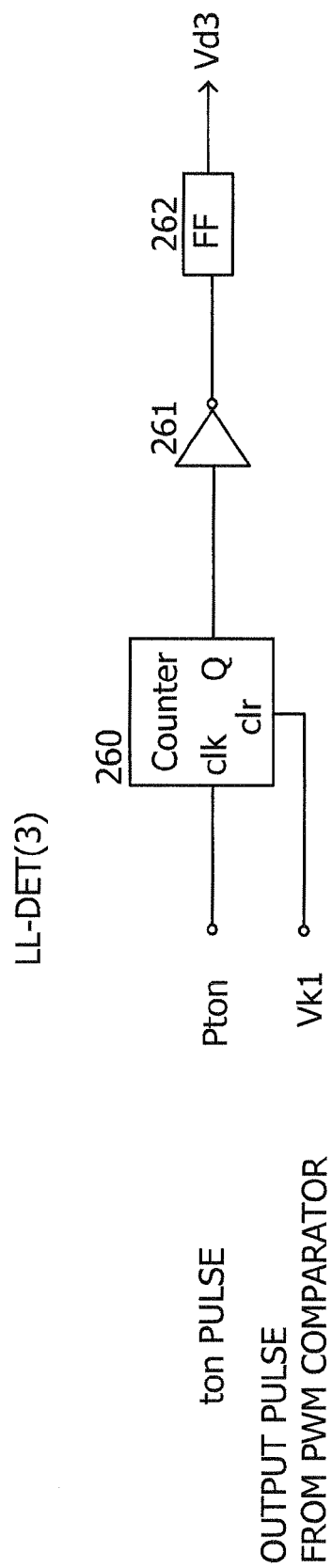
FIG. 16 illustrates a third example of the light load detector 22 in the power supply of FIG. 5 or the power supply of FIG. 6.
Figure 17:
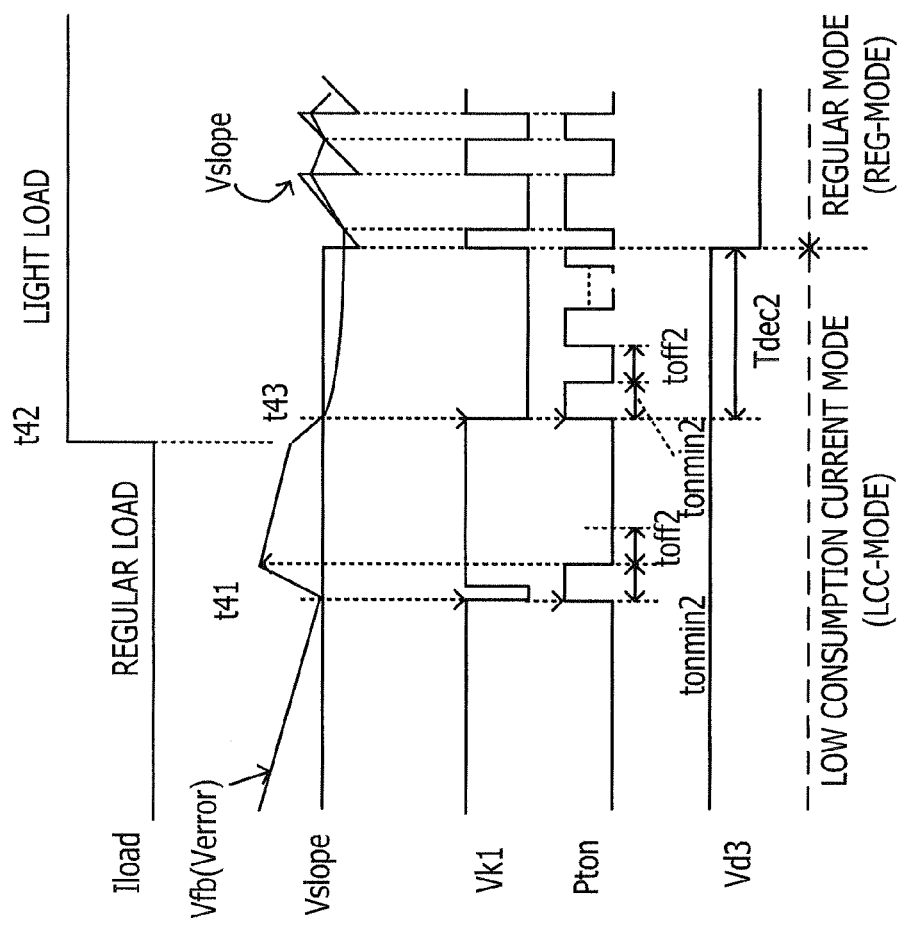
FIG. 17 illustrates timing charts representing the operation of the light load detector 22 of FIG. 16.

FIG. 16 illustrates a third example of the light load detector. The illustrated light load detector LL-DET(3) detects a transition from the light load state to the regular load state. FIG. 17 illustrates timing charts representing the operation of the light load detector of FIG. 16.

When the ton pulse Pton is successively detected a plurality of times corresponding to continuation of the state that the output voltage Vout is lower than the target voltage while the output pulse Vk1=L from the first comparator 15 is continued, the light load detector LL-DET (3) shifts a light load detection signal Vd3 to an L level and returns the power control to the regular mode. For example, in the light load state, as illustrated in FIG. 17, Vd3=H is held and, at a time t41, the ton pulse Pton=H is generated in response to the output pulse Vk1=L from the first comparator 15, whereupon the counter 260 conducts a count-up. However, the counter 260 is cleared in response to the output pulse Vk1=H.

Upon a transition from the light load to the regular load at a time t42, the output voltage Vout decreases and the feedback voltage Vfb (or the error voltage Verror) also decreases. When the feedback voltage Vfb reaches the comparative voltage Vslope at a time t43, the output pulse Vk1=L of the first comparator 15 is maintained. In response to the output pulse Vk1=L, the ton pulse Pton=H is generated repeatedly. In the above-described ton pulse generator 23 illustrated in FIG. 9, because the gate AND2 resets the flip-flop 235 and turns off the switch SWva1 per the H level of the second voltage va2, which corresponds to the toff pulse, in cooperation with the light load detection signal Vd=H and the output pulse Vk1=L, the ton pulse Pton is generated repeatedly during a period in which the output pulse Vk1=L is maintained. The repeatedly generated ton pulse Pton is made up of an H pulse having a width tonmin2 and an L pulse having a width toff2. Thus, when the counter 260 successively counts the ton pulse Pton=H and a count of Pton=H reaches the given number of times during a period Tdec2, the counter 260 outputs the light load detection signal Vd3=H through an inverter 261 and a flip-flop (FF) 262. As a result, the transition to the regular load state is detected.

After the return to the regular mode, the comparative voltage Vslope also returns to the sloped waveform and the first switch M1 is controlled to be turned on with the PWM control.

During the period Tdec2, the feedback voltage Vfb is lower than the comparative voltage Vslope. However, because the ton pulse generator 23 repeats, as the ton pulse Pton, the H level having the pulse width tonmin2 and the L level having the pulse width toff2, the counter 260 may conduct a count-up the given number of times.

[Light Load Detector (4)]

Figure 18:
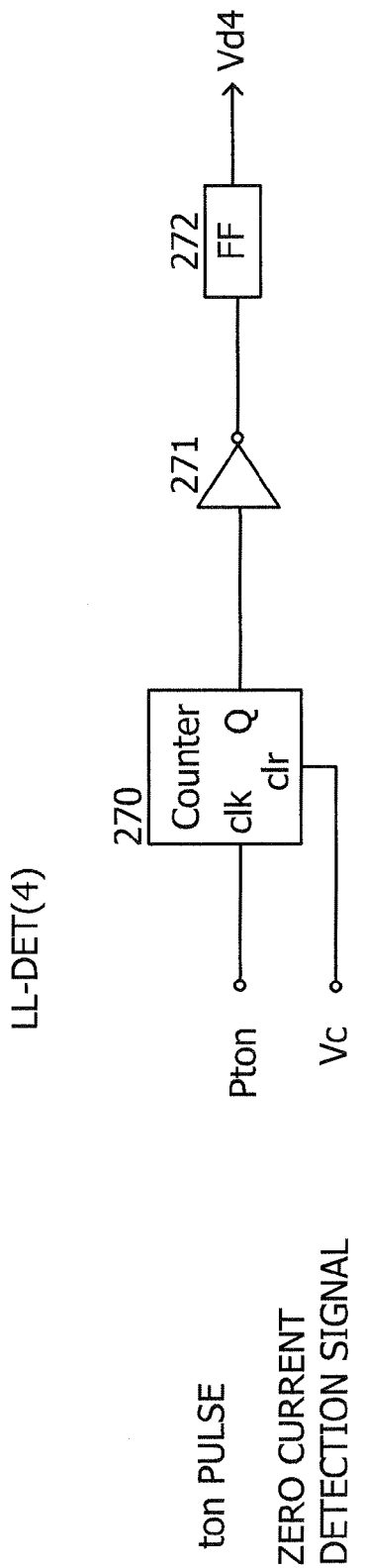
FIG. 18 illustrates a fourth example of the light load detector 22 in the power supply of FIG. 5 or the power supply of FIG. 6.
Figure 19:
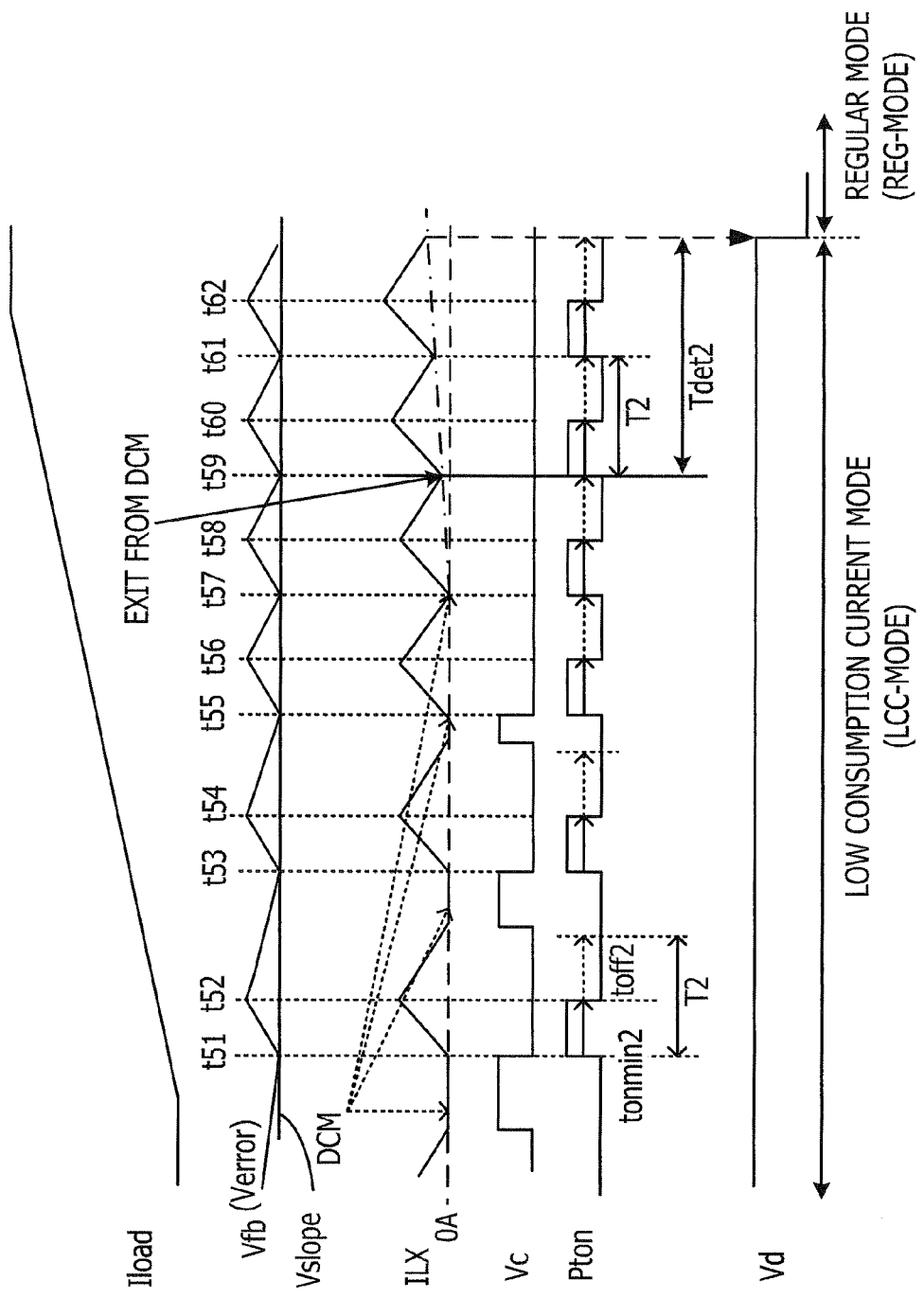
FIG. 19 illustrates timing charts representing the operation of the light load detector 22 of FIG. 18.

FIG. 18 illustrates a fourth example of the light load detector. The illustrated light load detector LL-DET(4) detects a transition from the light load state to the regular load state. FIG. 19 illustrates timing charts representing the operation of the light load detector of FIG. 18.

In the low consumption current mode LCC-MODE of the power supply, as described above, when the feedback voltage Vfb (or the error voltage Verror) is lower than the comparative voltage Vslope as indicated at times t51 and t52, the output pulse Vk1=L is generated. In response to the output pulse Vk1=L, the first switch M1 is turned on during the period (tonmin2) of the H level of the ton pulse Pton. In other words, the control for turning on the first switch M1 during the fixed time tonmin2 (the fixed on-control) is carried out. Further, in response to the detection signal Vc=H resulting from detecting the inductor current ILX=0, the drive controller 20 performs the DCM control for turning off the second switch M2.

When the load current Iload starts to rise at the time t51, the feedback voltage Vfb decreases at gradually increasing steepness after each of the times t52 and t54 at which the first switch M1 is turned off, and the ton pulse Pton becomes H at an earlier timing. In other words, the cycle of the on-state of the first switch M1 is shortened. Accordingly, more energy is accumulated in the inductor LOUT. Then, the ton pulse Pton is generated with repetition of the H level having the width tonmin2 and the L level having the width toff2, and the inductor current ILX no longer reaches zero amperes even during the period in which the first switch M1 is turned off. Stated another way, at times t57, t59 and t61, the inductor current ILX does not reach zero amperes and the detection signal Vc=H is not generated.

In view of the above-described point, the light load detector LL-DET(4) detects the regular load state by counting up the ton pulse Pton=H with the counter 270, and by shifting a light load detection signal Vd4 to an H level through an inverter 271 and a flip-flop (FF) 272 when the count-up is conducted the given number of times (twice in the fourth example of FIG. 19). Thus, when Pton=H is counted the given number of times during a period Tdec2, the light load state is detected for a transition to the regular mode REG-MODE.

Also in that case, as described above with reference to FIGS. 9 and 10, because the ton pulse generator 23 repeats, as the ton pulse Pton, the H level having the pulse width tonmin2 and the L level having the pulse width toff2, the counter 270 may count up Pton=H the given number of times.

Thus, in the low consumption current mode LCC-MODE, the fixed on-control is carried out to limit the on-cycle of the first switch M1 from increasing to 1/tonmin2 by providing the certain off period (L-level period) toff2 in the ton pulse Pton. In other words, the shortest cycle is set to T2=1/(tonmin2+toff2).

Further, in order to avoid the inductor current ILX from reaching zero with an increase of the load when the on-control of the first switch M1 is performed at the above-mentioned cycle T2, the pulse widths tonmin2 and toff2 are desirably set as follows.

The inductor current ILX rises when the first switch M1 is turned on, and falls when first switch M1 is turned off. Because a gradient of the rise of the inductor current ILX is given by (Vin−Vout)/Lout and a gradient of the fall of the inductor current ILX is given by (Vout−Vss)/Lout=Vout/Lout, a rise amount is expressed by tonmin2*((Vin−Vout)/Lout), and a fall amount is expressed by toff2*(Vout/Lout). By setting the pulse widths tonmin2 and toff2 so as to satisfy the following formulae, the inductor current ILX may avoid reaching zero amperes when the load increases.

$$\text{tonmin2}*((Vin-Vout)/Lout) > \text{toff2}*(Vout/Lout) \quad (6)$$

Namely:

$$\text{tonmin2}*(Vin-Vout) > \text{toff2}*Vout \quad (7)$$

Herein, Lout is the inductance of the inductor, and Vout is the target voltage.

Thus, by setting the pulse width of the ton pulse Pton as expressed by the above formula (7), when the load increases during the low consumption current mode, the control mode exits from the DCM mode because the inductor current ILX does not reach zero amperes and the detection signal Vc=H is not generated. In view of such a point, the light load detector detects the regular load state by monitoring that the detection signal Vc=H is not detected for a certain period. Upon detecting the regular load state, the light load detector returns the light load detection signal Vd4 to the L level for return to the regular mode.

The light load detector 22 in this embodiment may include both the light load detectors LL-DET(3) and LL-DET(4) of FIGS. 16 and 18 so that the light load detection signal Vd is shifted to the L level when any of the light load detectors detects the regular load state. In such a case, the logical sum of the light load detection signals Vd3 and Vd4 from the light load detectors LL-DET(3) and LL-DET(4) is output as the light load detection signal Vd. That arrangement enables the regular load state to be detected with higher reliability.

FIG. 20 illustrates a flowchart for power control in the power supply according to this embodiment. To summarize the above description, the power supply performs the power control in accordance with the flowchart of FIG. 20. In the regular mode, as indicated in step S12, the first comparator 15 compares the output voltage Vout (Vfb, Verror) with the comparative voltage Vslope having the sloped waveform so that the first switch M1 is controlled to be turned on with the PWM control. The drive control signal generator 24 generates the drive control signal Vo in response to the output pulse Vk1=L from the first comparator 15 and performs the fixed on-control for clamping the pulse width of the drive control signal Vo=H to the minimum pulse width tonmin1 or more. The drive controller 20 performs the DCM control to turn off the second switch M2 when the inductor current ILX=0 is detected (Vd=H).

When, during the regular mode, the light load detector 22 detects the inductor current ILX=0 the given number of times (YES in S14), or it detects the output pulse Vk1, which has become narrower than the minimum pulse width tonmin1 (Vk1<tonmin1), the given number of times (YES in S16), the control mode transits to the low consumption current mode (step S18). Step S14 corresponds to the light load detector LL-DET(1) described above as the first example and illustrated in FIG. 2, and step S16 corresponds to the light load detector LL-DET(2) described above as the second example and illustrated in FIG. 14.

In the low consumption current mode, as indicated in step S18, the comparative voltage Vslope is set to a fixed potential, and the first comparator 15 compares the output voltage Vout (Vfb, Verror) with the comparative voltage Vslope having the fixed potential so that the first switch M1 is controlled to be turned on with the PWM control. The drive control signal generator 24 generates the drive control signal Vo in response to the output pulse Vk1=L from the first comparator 15 and performs the fixed on-control for clamping the pulse width of the drive control signal Vo=H to the minimum pulse width tonmin2 (>tonmin1) or more and the pulse width of Vo=L to the minimum pulse width toff2 or more. The drive controller 20 performs the DCM control to turn off the second switch M2 when the inductor current ILX=0 is detected (Vd=H).

When, during the low consumption current mode, the light load detector 22 does not detect the inductor current ILX=0 for the given period (YES in S20), or the light load detector 22 detects Vk1=L being continued for the given period (YES in S22), the control mode returns to the regular mode (step S12). Step S20 corresponds to the light load detector LL-DET(3) described above as the third example and illustrated in FIG. 16, and step S22 corresponds to the light load detector LL-DET(4) described above as the fourth example and illustrated in FIG. 18.

In the regular mode S12, the fixed on-control may not always be performed. By performing the fixed on-control, however, the on-state of the first switch M1 in the light load state may be thinned out in the regular mode. That point is as per illustrated in the period from the time t10 to t12 in FIG. 11. Also, in the regular mode S12, the DCM control may be omitted. It is, however, desirable to provide the second comparator 19 for detecting the inductor current ILX=0 and to perform the detection of the light load in step S14 by using the detection signal Vc=H from the second comparator 19. If step S16 is executed without performing the light load detection in step S14, the second comparator 19 may be also no longer required.

In the low consumption current mode S18, the comparative voltage generator 16 may not be always required to provide the comparative voltage Vslope as the fixed potential. The comparative voltage Vslope may remain in the sloped waveform. By causing the comparative voltage generator 16 to provide the fixed potential, however, a current additionally consumed to generate the sloped waveform may be saved. Further, by setting, in the fixed-on control, the minimum pulse width tonmin2 of the on-pulse to be longer than the minimum pulse width tonmin1 in the regular mode, the on-cycle of the first switch M1 in the low consumption current mode may be made longer. In addition, the DCM control may not be always necessary. However, when the DCM control is not performed, step S22 may not be employed.

According to the power supply of the embodiment, as described above, the transition from the regular load state to the light load state may be detected with high accuracy and a desirable response. The transition from the light load state to the regular load state may also be similarly detected.

An object of the present invention is to provide a power supply and a power control device, which may detect a load reduction with high accuracy for a shift to the low consumption current mode.

The light load state may be detected with high accuracy.

All examples and conditional language recited herein are intended for pedagogical purposes to aid the reader in understanding the invention and the concepts contributed by the inventor to furthering the art, and are to be construed as being without limitation to such recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A power supply comprising:
   a first switch and a second switch coupled in series between an input voltage terminal to which an input voltage is applied and a reference voltage terminal to which a reference voltage lower than the input voltage is applied, the first switch provided on a side of the input voltage terminal and the second switch provided on a side of the reference voltage terminal;
   an inductor disposed between a junction coupling the first and second switches and an output terminal from which an output voltage is output; and
   a controller controlling the first and second switches to be alternately switched at a given switching cycle depending on an error of the output voltage with respect to a target voltage,
   wherein the controller changes the switching cycle of the first switch turning-on from a first cycle to a second cycle longer than the first cycle when a voltage at the junction when the second switch is in a turned-on state indicates a light load state.

2. The power supply according to claim 1, wherein, when the switching cycle acts according to the first cycle, the controller monitors a difference between the voltage at the junction and the reference voltage when the second switch is in the turned-on state, and changes the switching cycle from the first cycle to the second cycle depending on the monitored difference.

3. The power supply according to claim 1, wherein, when the switching cycle acts according to the first cycle, the controller changes the switching cycle from the first cycle to the second cycle upon the voltage at the junction reaching the reference voltage when the second switch is in the turned-on state.

4. The power supply according to claim 1, wherein, when the switching cycle acts according to the first cycle, the controller changes the switching cycle from the first cycle to the second cycle when the controller switches the first switch to a turned-on state a given number of times depending on the error after the voltage at the junction has reached the reference voltage when the second switch is in the turned-on state.

5. The power supply according to claim 1, wherein when the switching cycle is the second cycle, the controller controls a time during which the first switch is turned on to a fixed time.

6. The power supply according to claim 5, wherein the controller comprises:
   a first comparator for comparing the output voltage with a comparative voltage; and
   a drive controller for driving the first and second switches depending on a comparison result of the first comparator, and
   wherein when the output voltage is lower than the comparative voltage, the drive controller performs control to bring the first switch into a turned-on state and to continue the turned-on state of the first switch at least for a certain period, the certain period being set to a first period in a regular mode and to a second period longer than the first period in a low consumption current mode.

7. The power supply according to claim 6, wherein the controller performs discontinuous current control for bringing the second switch to a turned-off state when an inductor current flowing through the inductor reaches zero with the second switch being in the turned-on state.

8. The power supply according to claim 7, wherein, when the switching cycle acts according to the first cycle, the controller switches the regular mode to the low consumption current mode when the discontinuous current control and generation of an output pulse from the first comparator successively occur a given number of times.

9. The power supply according to claim 6, wherein, when the switching cycle acts according to the first cycle, the controller monitors an output pulse of the first comparator and switches the regular mode to the low consumption current mode when a pulse width of the output pulse becomes narrower than the certain period.

10. The power supply according to claim 6, wherein, when the switching cycle acts according to the second cycle, the controller switches the low consumption current mode to the regular mode when the control of turning on the first switch occurs a given number of times while the output voltage is lower than the comparative voltage.

11. The power supply according to claim 7, wherein, when the switching cycle acts according to the second cycle, the controller switches the low consumption current mode to the regular mode when the control of turning on the first switch occurs a given number of times while the discontinuous current control is not performed.

12. A power controller comprising:
    a controller for controlling a first switch and a second switch, which are coupled in series between an input voltage terminal to which an input voltage is applied and a reference voltage terminal to which a reference voltage lower than the input voltage is applied, to be alternately switched at a given switching cycle depending on an error of an output voltage with respect to a target voltage, the output voltage being generated through an inductor disposed at a junction coupling the first and second switches, wherein the first switch is provided on a side of the input voltage terminal and a second switch is provided on a side of the reference voltage terminal, and wherein the controller changes the switching cycle of the first switch turning-on from a first cycle to a second cycle, which is longer than the first cycle, when a voltage at the junction when the second switch is in a turned-on state indicates a light load state.

13. A power supply control method comprising:

performing switching control of a first switch and a second switch at a given switching cycle depending on an error of an output voltage with respect to a target voltage, the first switch and the second switch coupled in series between an input voltage terminal and a reference voltage terminal to which a reference voltage lower than the input voltage is applied, the first switch provided on a side of the input voltage terminal and the second switch provided on a side of the reference voltage terminal; and changing the switching cycle of the first switch turning-on from a first cycle to a second cycle, which is longer than the first cycle, when a voltage at an output node indicates a light load state.

14. A power supply comprising:

a first switch and a second switch coupled in series between an input voltage terminal to which an input voltage is applied and a reference voltage terminal to which a reference voltage lower than the input voltage is applied, the first switch provided on a side of the input voltage terminal and the second switch provided on a side of the reference voltage terminal;

an inductor disposed between a junction coupling the first and second switches and an output terminal from which an output voltage is output; and a controller for controlling the first and second switches to be alternately switched at a given switching cycle depending on an error of the output voltage with respect to a target voltage, wherein the controller performs control to establish a regular mode setting the switching cycle to a first cycle under a regular load, and a low consumption current mode setting the switching cycle of the first switch turning-on to a second cycle, which is longer than the first cycle, under a low load lighter than the regular load, wherein the controller comprises a first comparator for comparing the output voltage with a comparative voltage, and a drive controller for driving the first and second switches depending on a comparison result of the first comparator, and wherein when the output voltage is lower than the comparative voltage, the drive controller performs control to bring the first switch into a turned-on state and to continue the turned-on state of the first switch at least for a certain period, the certain period being set to a first period in the regular mode and to a second period longer than the first period in the low consumption current mode.

15. The power supply according to claim 14, wherein, in the regular mode, the controller monitors a voltage at the junction when the second switch is in the turned-on state, and switches the regular mode to the low consumption current mode when the voltage at the junction reaches the reference voltage.

16. The power supply according to claim 15, wherein the controller performs discontinuous current control for bringing the second switch to a turned-off state when an inductor current flowing through the inductor reaches zero with the second switch being in the turned-on state.

17. The power supply according to claim 16, wherein the controller switches the regular mode to the low consumption current mode when the discontinuous current control and generation of an output pulse from the first comparator successively occur a given number of times in the regular mode.

18. The power supply according to claim 14, wherein the controller monitors an output pulse of the first comparator in the regular mode and switches the regular mode to the low consumption current mode when a pulse width of the output pulse becomes narrower than the certain period.

19. The power supply according to claim 14, wherein the controller switches the low consumption current mode to the regular mode when the control of turning on the first switch occurs a given number of times in the low consumption current mode during a period in which the output voltage is lower than the comparative voltage.

20. The power supply according to claim 16, wherein the controller switches the low consumption current mode to the regular mode when the control of turning on the first switch occurs a given number of times in the low consumption current mode during a period in which the discontinuous current control is not performed.

* * * * *